United States Patent
Smith

(10) Patent No.: US 9,204,170 B2
(45) Date of Patent: Dec. 1, 2015

(54) METHOD FOR IMAGE DATA PROCESSING UTILIZING MULTIPLE TRANSFORM ENGINES

(75) Inventor: Peter Lionel Smith, Bromley (GB)

(73) Assignee: RGB Systems, Inc., Anaheim, CA (US)

( * ) Notice: Subject to any disclaimer, the term of this patent is extended or adjusted under 35 U.S.C. 154(b) by 1537 days.

(21) Appl. No.: 11/991,027

(22) PCT Filed: Aug. 11, 2006

(86) PCT No.: PCT/GB2006/003008
§ 371 (c)(1),
(2), (4) Date: Sep. 30, 2009

(87) PCT Pub. No.: WO2007/023254
PCT Pub. Date: Jan. 3, 2007

(65) Prior Publication Data
US 2010/0014590 A1    Jan. 21, 2010

(30) Foreign Application Priority Data

Aug. 26, 2005  (GB) .................................. 0517501.3

(51) Int. Cl.
*H04N 19/68* (2014.01)
*H04N 19/176* (2014.01)
(Continued)

(52) U.S. Cl.
CPC ............. *H04N 19/68* (2014.11); *H04N 19/107* (2014.11); *H04N 19/132* (2014.11); *H04N 19/17* (2014.11); *H04N 19/176* (2014.11); *H04N 19/42* (2014.11); *H04N 19/507* (2014.11); *H04N 19/61* (2014.11); *H04N 19/63* (2014.11); *H04N 19/635* (2014.11); *H04N 19/645* (2014.11);
(Continued)

(58) Field of Classification Search
None
See application file for complete search history.

(56) References Cited

U.S. PATENT DOCUMENTS 4,442,454 A    4/1984    Powell .......................... 358/167
4,754,336 A    6/1988    Nishizawa .................... 358/261
(Continued)

FOREIGN PATENT DOCUMENTS

EP    0497545 A2    1/1992
EP    0539155 A2    10/1992
(Continued)

OTHER PUBLICATIONS

Marcellin, Michael W.,"JPEG2000 for Digital Cinema," *SMPTE Motion Imaging Journal*, May/Jun. 2005.
Search Report based on GB0517501.3 dated Nov. 1, 2005.
Written Opinion based on PCT/GB2006/003008, dated Mar. 27, 2008.
International Preliminary Report on Patentability based on PCT/GB2006/003008 dated May 16, 2008.
(Continued)

*Primary Examiner* — William C Vaughn, Jr.
*Assistant Examiner* — Michael J Hess
(74) *Attorney, Agent, or Firm* — The Hecker Law Group, PLC

(57) ABSTRACT

Methods of spatial compression of image data using trees formed with logic gates are described. Data encoding is achieved using a five-level wavelet transform, such as the Haar or 2/10 transforms. A dual transform engine is used, the first engine being used for the first transform, and the subsequent transforms being performed by the second engine. Each bit plane of the resulting coefficients is then encoded by forming a tree structure from the bits and logical OR combinations thereof. Redundant data are removed. Further data can be removed with a predetermined compression profile. The resulting blocks of compressed data are of variable length and are packaged with sync and index words for transmission so that the location and identity of the transformed data blocks can be determined.

10 Claims, 20 Drawing Sheets

(51) Int. Cl.

| | | |
|---|---|---|
| *H04N 19/70* | (2014.01) | |
| *H04N 19/64* | (2014.01) | |
| *H04N 19/63* | (2014.01) | |
| *H04N 19/61* | (2014.01) | |
| *H04N 19/107* | (2014.01) | |
| *H04N 19/132* | (2014.01) | |
| *H04N 19/17* | (2014.01) | |
| *H04N 19/635* | (2014.01) | |
| *H04N 19/42* | (2014.01) | |
| *H04N 19/89* | (2014.01) | |
| *H04N 19/645* | (2014.01) | |
| *H04N 19/86* | (2014.01) | |
| *H04N 19/507* | (2014.01) | |
| *H04N 19/13* | (2014.01) | |

(52) U.S. Cl.
CPC ............ *H04N 19/647* (2014.11); *H04N 19/70* (2014.11); *H04N 19/86* (2014.11); *H04N 19/89* (2014.11); *H04N 19/13* (2014.11)

(56) References Cited

U.S. PATENT DOCUMENTS

| | | | | |
|---|---|---|---|---|
| 5,394,189 | A | | 2/1995 | Motomura et al. ............ 348/402 |
| 5,412,741 | A | | 5/1995 | Shapiro ......................... 382/232 |
| 5,502,571 | A | | 3/1996 | Decotignie et al. ........... 358/335 |
| 5,511,094 | A | | 4/1996 | Lee et al. ....................... 375/243 |
| 5,726,711 | A | | 3/1998 | Boyce ............................ 348/408 |
| 5,732,157 | A | | 3/1998 | Osawa ........................... 382/244 |
| 5,887,110 | A | | 3/1999 | Sakamoto et al. .............. 386/68 |
| 6,081,163 | A | * | 6/2000 | Ujiie et al. ......................... 331/2 |
| 6,216,145 | B1 | * | 4/2001 | Zandi et al. .................... 708/400 |
| 6,339,658 | B1 | | 1/2002 | Moccagatta et al. .......... 382/240 |
| 6,965,724 | B1 | | 11/2005 | Boccon-Gibod et al. ....... 386/68 |
| 6,996,281 | B2 | | 2/2006 | Boliek et al. .................. 382/236 |
| 7,158,682 | B2 | | 1/2007 | Sano .............................. 382/236 |
| 7,269,291 | B2 | | 9/2007 | Terao ............................. 382/240 |
| 2003/0035475 | A1 | | 2/2003 | Adelaide et al. .......... 375/240.01 |
| 2003/0202602 | A1 | | 10/2003 | Apostolopoulos et al. ......................... 375/240.24 |
| 2004/0091240 | A1 | * | 5/2004 | Takei ............................... 386/46 |
| 2004/0120592 | A1 | * | 6/2004 | Fernandes ..................... 382/240 |
| 2005/0015247 | A1 | * | 1/2005 | Sakuyama et al. ............ 704/229 |
| 2005/0031218 | A1 | * | 2/2005 | Berkner et al. ................ 382/240 |
| 2005/0036701 | A1 | * | 2/2005 | Miyazawa et al. ............ 382/240 |
| 2005/0063470 | A1 | | 3/2005 | Bottreau et al. ........... 375/240.19 |
| 2005/0111740 | A1 | * | 5/2005 | Sakuyama ..................... 382/232 |
| 2005/0207664 | A1 | * | 9/2005 | Ramasastry et al. .......... 382/240 |
| 2006/0167784 | A1 | * | 7/2006 | Hoffberg ......................... 705/37 |
| 2007/0160147 | A1 | * | 7/2007 | Kondo et al. ............. 375/240.18 |
| 2008/0260275 | A1 | * | 10/2008 | Ueno et al. .................... 382/249 |

FOREIGN PATENT DOCUMENTS

| | | |
|---|---|---|
| EP | 0590800 A2 | 9/1993 |
| EP | 0801506 A2 | 10/1997 |
| EP | 0808068 A2 | 11/1997 |
| EP | 0843437 A2 | 5/1998 |
| EP | 0905978 | 3/1999 |
| EP | 1 009 160 | 6/2000 |
| EP | 1189145 A2 | 3/2002 |
| GB | 2247132 A | 2/1992 |
| JP | 8205151 | 8/1996 |
| JP | 10229558 | 8/1998 |
| JP | 11055668 | 2/1999 |
| JP | 11098128 | 4/1999 |
| JP | 11122617 | 4/1999 |
| JP | 11136685 | 5/1999 |
| JP | 11168633 | 6/1999 |
| JP | 2000-174632 | 6/2000 |
| JP | 2001-298738 | 10/2001 |
| JP | 2002-135721 | 5/2002 |
| JP | 2002-171412 | 6/2002 |
| JP | 2003 003745 | 1/2003 |
| JP | 2003023641 | 1/2003 |
| JP | 2003-132346 | 5/2003 |
| JP | 2003-274186 | 9/2003 |
| JP | 2004-40388 | 2/2004 |
| JP | 2004-505520 | 2/2004 |
| JP | 2004-112760 | 4/2004 |
| JP | 2004166183 | 6/2004 |
| JP | 2005-110185 | 4/2005 |
| JP | 2005-218124 | 8/2005 |
| WO | WO 98/19274 | 5/1998 |
| WO | WO 03/021936 | 3/2003 |
| WO | WO 00/40033 | 5/2004 |
| WO | WO2005043919 | 5/2005 |

OTHER PUBLICATIONS

Amir, Said, et al.: "A New, Fast, and Efficient Image Codec Based on Set Partitioning in Hierarchical Trees," *IEEE Transactions on Circuits and Systems for Video Technology*, IEEE Service Center, vol. 6, No. 3, Jun. 1996.

Shapiro, J. M.: "Embedded Image Coding Using Zerotrees of Wavelet Coefficients," *IEEE Transactions on Signal Processing*, IEEE Service Center, v. 41, No. 12, Dec. 1, 1993.

Oliver, J, et al.: "A New Fast Lower-Tree Wavelength Image Encoder" *Proceedings 2001 International Conference on Image Processing*. ICIP 2001. Thessaloniki, Greece, Oct. 7-10, 2001, International Conference on Image Processing, NY, NY: IEEE, US, v.1 of 3 Conf. 8, Oct. 7, 2001, pp. 780-783.

International Search Report dated Jul. 31, 2007 from corresponding British Application Serial No. PCT/GB2006/003008.

Hongyang, C. et al.: "An Approach to Integer Wavelet Transformations for Lossless Image Compression," Lecture Notes Pure Appl. Math. 202 (1998).

Fowler, J. E.: "Embedded Wavelet-Based Image Compression: State of the Art" *IT-Information Technology, Oldenbourg Wissenschaaftsverlag, München, DE*, v. 45, No. 5, Oct. 2003, pp. 256-262.

Tae Won Hur, et al.: "An Image Coding Using Overlapped Wavelet Transform With Permutation Scan," *Circuits and Systems*, 1996., IEEE Asia Pacific Conference on Seoul, South Korea Nov. 18-21, 1996, NY, NY, USA IEEE, US, Nov. 18, 1996, pp. 14-17.

Gormish, M. J., et al.: "Lossless and Nearly Lossless Compression for High Quality Images," *Proceedings of the SPIE, SPIE*, Bellingham, VA, US, v/ 3025, Feb. 10, 1997, pp. 62-70.

Saha S., et, al.: "Use of Adaptive Integer-to-Integer Wavelet Transforms in Lossless Image Coding," ISCAS 2001. Proceedings of the 2001 IEEE International Symposium on Circuits and Systems. Sydney, Australia, May 6-9, 2001, IEEE International Symposium on Circuits and Systems, NY, NY: IEEE, US, v. 1 of 5, May 6, 2001 pp. 393-396.

Rabbani, M., et, al.: "An Overview of the JPEG 2000 Still Image Compression Standard," Signal Processing. Image Communication, Elsevier Science Publishers, Amsterdam, NL, v. 17, No. 1, Jan. 2002 pp. 3-48.

Ørbæk, P.: "A Real-Time Software Video Codec Based on Wavelets," *Communication Technology Proceedings, 2000. WCC-ICCT 2000. International Conference on Beijing, China* Aug. 21-25, v. 2, Aug. 21, 2000 pp. 1149-1156.

Namgoong, W., et al.: "Low-Power Video Encoder/Decoder Using Wavelet/TVSQ with Conditional Replenishment," 1996 IEEE International Conference on Acoustics, Speech and Signal Processing-Proceedings. (ICASSP). Atlanta, May 7-10, 1996, IEEE International Conference . . . NY, NY, IEEE, US, v. 6 Conference 21, May 7, 1996, pp. 3240-3243.

Mounts, F.W.: "A Video Encoding System with Conditional Picture-Element Replenishment," Bell System Technical Journal, AT &T, Short Hills, NY, US. V.48, No. 7, Sep. 1969, pp. 2545-2554.

Xiaolin Wu, et al.: "On Packitization of Embedded Multimedia Bitstreams," *IEEE Transactions on Multimedia*, IEEE Service Center, Piscataway, HJ, US, v. 3, No. 1, Mar. 2001.

* cited by examiner

FIG. 8

$$P := \begin{pmatrix} 0 & 0 & 0 & 0 & 5 & 10 & 0 & 0 & 0 & 0 \\ 0 & 0 & 0 & 0 & 15 & 25 & 0 & 0 & 0 & 0 \\ 0 & 0 & 0 & 0 & 20 & 28 & 0 & 0 & 0 & 0 \\ 0 & 0 & 0 & 0 & 30 & 35 & 0 & 0 & 0 & 0 \\ 80 & 64 & 35 & 38 & 80 & 48 & 89 & 75 & 65 & 54 \\ 74 & 54 & 30 & 22 & 45 & 110 & 90 & 80 & 70 & 60 \\ 0 & 0 & 0 & 0 & 25 & 30 & 0 & 0 & 0 & 0 \\ 0 & 0 & 0 & 0 & 15 & 10 & 0 & 0 & 0 & 0 \\ 0 & 0 & 0 & 0 & 18 & 22 & 0 & 0 & 0 & 0 \\ 0 & 0 & 0 & 0 & 10 & 4 & 0 & 0 & 0 & 0 \end{pmatrix}$$

|   | 0 | 1 | 2 | 3 | 4 |
|---|---|---|---|---|---|
| 0 | 0 | 0 | 7 | 0 | 0 |
| 1 | 0 | 0 | 20 | 0 | 0 |
| 2 | 0 | 0 | 24 | 0 | 0 |
| 3 | 0 | 0 | 32 | 0 | 0 |
| 4 | 72 | 36 | 64 | 82 | 59 |
| 5 | 64 | 26 | 77 | 85 | 65 |
| 6 | 0 | 0 | 27 | 0 | 0 |
| 7 | 0 | 0 | 12 | 0 | 0 |
| 8 | 0 | 0 | 20 | 0 | 0 |
| 9 | 0 | 0 | 7 | 0 | 0 |

H =

|   | 0 | 1 | 2 | 3 | 4 |
|---|---|---|---|---|---|
| 0 | 0 | 0 | -5 | 0 | 0 |
| 1 | 0 | 0 | -10 | 0 | 0 |
| 2 | 0 | 0 | -8 | 0 | 0 |
| 3 | 0 | 0 | -5 | 0 | 0 |
| 4 | 16 | -3 | 32 | 14 | 11 |
| 5 | 20 | 8 | -65 | 10 | 10 |
| 6 | 0 | 0 | -5 | 0 | 0 |
| 7 | 0 | 0 | 5 | 0 | 0 |
| 8 | 0 | 0 | -4 | 0 | 0 |
| 9 | 0 | 0 | 6 | 0 | 0 |

FIG. 10

$$LL = \begin{pmatrix} 0 & 0 & 13 & 0 & 0 \\ 0 & 0 & 28 & 0 & 0 \\ 68 & 31 & 70 & 83 & 62 \\ 0 & 0 & 19 & 0 & 0 \\ 0 & 0 & 13 & 0 & 0 \end{pmatrix} \quad LH = \begin{pmatrix} 0 & 0 & -13 & 0 & 0 \\ 0 & 0 & -8 & 0 & 0 \\ 8 & 10 & -13 & -3 & -6 \\ 0 & 0 & 15 & 0 & 0 \\ 0 & 0 & 13 & 0 & 0 \end{pmatrix}$$

$$HL = \begin{pmatrix} 0 & 0 & -8 & 0 & 0 \\ 0 & 0 & -7 & 0 & 0 \\ 18 & 2 & -17 & 12 & 10 \\ 0 & 0 & 0 & 0 & 0 \\ 0 & 0 & 1 & 0 & 0 \end{pmatrix} \quad HH = \begin{pmatrix} 0 & 0 & 5 & 0 & 0 \\ 0 & 0 & -3 & 0 & 0 \\ -4 & -11 & 97 & 4 & 1 \\ 0 & 0 & -10 & 0 & 0 \\ 0 & 0 & -10 & 0 & 0 \end{pmatrix}$$

FIG. 11

$r := 0..4 \quad c := 2$ $L_{r,c} = \begin{array}{|c|} \hline 64 \\ \hline 77 \\ \hline \end{array} \quad H_{r,c} = \begin{array}{|c|} \hline 48 \\ \hline -45 \\ \hline \end{array} \quad LL_{(r,c)} = \begin{array}{|c|} \hline 13 \\ \hline 28 \\ \hline 70 \\ \hline 19 \\ \hline 13 \\ \hline \end{array} \quad HL_{(r,c)} = \begin{array}{|c|} \hline -8 \\ \hline -7 \\ \hline 1 \\ \hline 0 \\ \hline 1 \\ \hline \end{array}$ $r := 2 \quad c := 2 \quad LH_{(r,c)} = -16 \quad HH_{(r,c)} = 95$

C0 TO C15 = COEFFICIENTS
K0 TO K3 = K TYPES
L1_0 = L TYPE

FIG. 19

Bit number

| √Row | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | LL5 | LH5 | HL5 | HH5 | LH4 | LH4 | LH4 | LH4 | LH4 | HL4 | HL4 | HL4 | HL4 | HH4 | HH4 | HH4 |
| 1 | LH3 | LH3 | LH3 | LH3 | LH3 | LH3 | LH3 | LH3 | LH3 | LH3 | LH3 | LH3 | LH3 | LH3 | LH3 | LH3 |
| 2 | HL3 | HL3 | HL3 | HL3 | HL3 | HL3 | HL3 | HL3 | HL3 | HL3 | HL3 | HL3 | HL3 | HL3 | HL3 | HL3 |
| 3 | HH3 | HH3 | HH3 | HH3 | HH3 | HH3 | HH3 | HH3 | HH3 | HH3 | HH3 | HH3 | HH3 | HH3 | HH3 | HH3 |
| 4 | LH2 | LH2 | LH2 | LH2 | LH2 | LH2 | LH2 | LH2 | LH2 | LH2 | LH2 | LH2 | LH2 | LH2 | LH2 | LH2 |
| . | | | | | | | | | | | | | | | | |
| . | | | | | | | | | | | | | | | | |
| 15 | HH2 | HH2 | HH2 | HH2 | HH2 | HH2 | HH2 | HH2 | HH2 | HH2 | HH2 | HH2 | HH2 | HH2 | HH2 | HH2 |

12 Rows of Level2 coefficient data

| 16 | LH1 | LH1 | LH1 | LH1 | LH1 | LH1 | LH1 | LH1 | LH1 | LH1 | LH1 | LH1 | LH1 | LH1 | LH1 | LH1 |
|---|---|---|---|---|---|---|---|---|---|---|---|---|---|---|---|---|
| . | | | | | | | | | | | | | | | | |
| . | | | | | | | | | | | | | | | | |
| 63 | HH1 | HH1 | HH1 | HH1 | HH1 | HH1 | HH1 | HH1 | HH1 | HH1 | HH1 | HH1 | HH1 | HH1 | HH1 | HH1 |

48 Rows of Level1 coefficient data

Diagram Showing Translation of Compressed Image Stream to IP Packets

METHOD FOR IMAGE DATA PROCESSING UTILIZING MULTIPLE TRANSFORM ENGINES

The present invention relates to methods of data processing, and in particular, to methods of processing data relating to images. The invention is particularly, but not exclusively, concerned with methods of data compression.

The Compression Problem

Assuming that an electronic image is already in a digital form, image compression is the means by which the number of data bits required to represent the image is significantly reduced. Typical parameters are as follows:

| | |
|---|---|
| Color parameters | 3 (e.g. RGB or YUV) |
| Bits per color | 8 (or e.g. 4, 10, 12) |
| Horizontal pixels | 1400 (or, e.g. 720, 1024, 1600, 1920) |
| Vertical pixels | 1050 (or, e.g. 588, 768, 1200) |
| Frames per second | 60 (or, e.g. 24, 30, 85) |

Thus an uncompressed data rate for an SXGA+ (1400×1050) image running at 60 Hz, which could be a typical requirement for a high-end product, could be:

3×8×1400×1050×60=2,116,800,000 bits per second

"Traditional" methods of bandwidth reduction, originally introduced in the analog era, but in fact equally applicable today include: (a) the reduction of colour bits by using alternative colour space (e.g. reduced chrominance information); and (b) the reduction of data per frame (e.g. by using "interlaced" images each of half full frame resolution, but still allowing high frame rate for motion).

Thus, a "High-Definition" image data rate (based on the so-called 1920i format) could be:

16×1920×1024×30=943,718,400 bits per second

However, such arrangements can, at best, only partially alleviate the problem. Clearly much more aggressive methods are needed. Target bit rates for images ranging from video to UXGA, with varying amounts of motion, lie in the range 0.5-100 Mb/s, with an emphasis on rates below 10 Mb/s.

Basis of Compression

There are two types of image compression, spatial and temporal. Spatial compression reduces the amount of information needed to describe a single image frame, and temporal compression reduces the need to send full frame data for every frame, while still maintaining movement in the decompressed image.

A desirable strategy for compressing a single-image frame using spatial compression is as follows:
 (a) finding a method by which the image can be described in a more efficient or "shorthand" way; for example if a large area is colored green, simply defining the area with a limited number of co-ordinates, and coding it "green" instead of recording every pixel;
 (b) optionally taking advantage of known characteristics of human vision, and eliminate or reduce the data relating to aspects of the image that the human viewer may not see; and
 (c) taking the resulting numerical data and recording it more efficiently, for example by suppressing redundant zeros, or using standard lossless data compression techniques like run length encoding.

The principal strategy for temporal compression is to compare successive images, and to limit the information transmitted to the changes between one image and another. When such a method is used, there must be a method of periodically sending a full frame image or its equivalent to ensure that the image reconstruction is working from a correct datum.

Required Attributes of a Compression System

In developing a compression system for particular applications, a number of priorities can be identified:
 (a) the system must work in real time with minimum latency;
 (b) the system must be suitable for different "bit depths"; while 8-bit pixels are typically used, it would be desirable to extend the system to 10- or 12-bit pixels for particular applications;
 (c) the system must be scaleable in respect of spatial resolution; the highest current resolution is 1 600×1200 (UXGA) but in principle the system should be able to cope with higher resolutions as they are introduced;
 (d) in hardware terms the system needs to be "symmetrical", i.e. the cost of realizing the encoder should not be significantly different from that of realizing a decoder; (although it is recognized that there is also a place for a software-based decoder for some applications);
 (e) the system must be realizable using standard components (although an ASIC version would be envisaged for high volume applications);
 (f) it must be possible to extract a low-resolution version of a high-resolution image or to extract part of a high resolution image, without the need to process the whole high resolution image data: this feature is of great significance.

Choice of the Wavelet Transform

Practical spatial image compression systems require a method by which redundancy in the image information can be easily identified and eliminated. While it is theoretically possible to analyze the original pixel numerical data, in practice this is inefficient and computationally intensive.

Current practice is to "transform" the original pixel data into another format. The new format does not itself reduce the amount of data needed to represent the image, but what it does do is to present the data in such a way that redundant information can be easily identified and eliminated. It also presents the data in a way that can be efficiently encoded.

The idea of a transform is exemplified by the Fourier theorem that states that any complex waveform can be reproduced by adding together a number of harmonically related sine waves of varying amplitudes. The greater the number of harmonics used, the closer the result is to the original waveform. Thus, for example, a "square wave" can either be described in the "time" domain, where its amplitude is shown as changing from zero to maximum and back again at regular intervals, or it can be described in the "frequency" domain; where a set of coefficients is given that applies to each harmonic of the fundamental frequency of the original waveform.

The concept of a transform is neatly illustrated by the square wave example. If the amplitude of the harmonics is plotted against frequency, a Sin x/x function is the result.

FIG. 1 shows such a "transform pair". If the left waveform represents the amplitude with respect to time, the right shows the distribution of frequencies, but the same is trite in reverse: if the left represents the distribution of frequencies, the right represents the resulting amplitude with respect to time.

A characteristic of the transform pair shown is that as the left function gets narrower, the right hand function gets wider. This is the equivalent of saying that if only a narrow range of frequencies is involved, the resulting amplitude distribution will be "wide and flat"—at the limit when the frequency distribution is zero, the result is a flat line of infinite length, i.e. "DC".

An interesting point about this transform pair example is that it gives a clue as to how a time/frequency transform can be made. If the left function represents the bandwidth of a filter, the right function represents the filter's impulse response.

Image compression does indeed use the idea of the frequency domain. The usual arrangement is to divide the image into blocks, each block consisting of an array of pixels. Each block is then reviewed for frequency distribution: "high" frequency occurs at image "edges", whereas an area of uniform "brightness" exhibits "low" frequency.

The best known transform for image compression is the Discrete Cosine Transform (DCT), a special version of the Fourier transform. The principle is that of "testing" the image data against a range of frequencies, and generating a coefficient for each. The process requires the use of basis functions that are themselves in principle endless sine waves (but in practice necessarily truncated). A feature of the DCT is that the frequency domain is divided into equal increments, and a corollary of this is that the basis functions contain a different number of cycles according to frequency.

The Wavelet Transform has gained popularity as an alternative to the DCT and is achieved using a series of complementary high and low pass filters that divide the input bandwidth in half, arranged in cascade. The output of each filter is down-sampled by a factor of two, as illustrated in FIG. 2, so that the output data of the cascade is the same size as the input data. The high pass filter's impulse response is a "wavelet".

The characteristic of a wavelet is that, in this context, the wavelet basis functions all contain the same number of cycles, irrespective of frequency: meaning that they are of different length. In the cascade arrangement shown, the set of wavelets is derived from one single wavelet that is scaled by a factor of two at each stage.

At the end of the cascade, there is a heavily band-limited signal. Adding coefficients from the previous frequency band doubles the available resolution, and if the process is repeated, resolution is doubled again. This demonstrates three attributes of the wavelet transform:
 (a) it is naturally scaleable;
 (b) the frequency domain is divided into octaves, and not equal increments; and
 (c) in the image processing context, it is possible to derive a low resolution version of the image by using only part of the available data.

To take a simple example, if 16 input samples are fed into a four-stage cascade, the first stage will yield eight difference samples; the next four, the next two, finally a single difference signal along with a single value derived from the sequence of low pass filters which can be regarded as the average "brightness" of all 16 samples (DC component). The total number of output samples is the same as that of the input, i.e.:

(8+4+2+1)differences+(1)average=16

The high-frequency components of the image are described by a large number of short wavelets, the low-frequency parts by a small number of long wavelets.

The wavelet transform can be regarded as a series of discrete signals in time, each of which gives a multiple resolution analysis of the image. The purpose of the transform is to deconstruct the image into coefficients that are of greater or lesser significance. Insignificant coefficients can then be quantised or eliminated. The wavelet transform provides the best compaction of significant coefficients (compared to other transforms).

Electronic images are not "one-dimensional" but consist of two-dimensional pixel arrays. Thus, in image compression it is necessary to carry out the transform process in two dimensions. The process of single stage wavelet decomposition is shown in FIG. 3. The original image is filtered into four frequency bands; LL is the original image low pass filtered and sub-sampled in both the horizontal and vertical directions. HL consists of the residual vertical frequencies, i.e. the vertical component of the difference between the original image and the LL image. Similarly, LH contains the residual horizontal frequencies, and HH, being the high-frequency component of both vertical and horizontal filtering, represents the residual diagonal frequencies.

In practice a multi-stage decomposition takes place. LL represents the whole image (or section of image) at reduced resolution, so now the filtering process is applied to the LL image to achieve a second level of decomposition. In order to achieve a lossless transform (i.e. one where no information content is lost) it is necessary to repeat the process down to the spatial equivalent of the individual pixel.

Thus, for example if the process is applied to a 4×4 pixel block, a "Level 1" transform can be imagined where four coefficients are derived by applying the filter pair in both the horizontal and vertical directions. A "Level 2" transform then carries out the same process on the one quarter of the information representing the outputs of the low pass filters, which in spatial terms is at the pixel level. (If the block were bigger, more "levels" would be required to achieve the lossless transform.)

The decoding of the transform ("reconstruction") is the inverse of the encoding ("decomposition" or "deconstruction") process—pointing to a high degree of symmetry in any practical execution. At the simple filter pair level, if the two input streams are up-sampled by a factor of two, then filtered and re-combined, the result is the original spatial data. For perfect reconstruction to take place the decoding filters must exactly match the response of the encoding filters, and the number of "levels" must be the same.

The wavelet transform was chosen as the basis of the preferred compression method because:
 (a) it has inherent scalability;
 (b) it provides the best compaction of significant transform coefficients;
 (c) it is easy to derive a low-resolution version of an image without processing the whole image data;
 (d) it is amenable to fast parallel processing;
 (e) it is amenable to efficient encoding; and
 (f) the encoding and decoding processes (to and from the transform) are symmetrical.

In realizing a compression system based on the wavelet transform a number of important practical points have to be taken into account in order to ensure that the system is practicable to realize using standard components, and that it meets the needs of the market.

Some particular points that had a great influence on the design are:
 (a) the system must be able to accommodate a wide range of spatial compression ratios from lossless (typical achieved ratio 2:1) though visually lossless (maybe as high as 30:1) up to lossy (50:1 and upwards);
 (b) the operation of the encoding and decoding processes must be deterministic, in the sense that they must operate within defined time cycles, independent of the complexity of the image. Obviously they must operate in "real time"; and
 (c) the differing needs of full motion "video" images and high resolution "graphics" images must be fully taken into account.

A description of the overall system can be divided into sections, summarized as:
 (a) the input system, choice of color space;
 (b) the wavelet transform engine;
 (c) the encoding of the resultant data;
 (d) the encoding for temporal compression;
 (e) the network connection; and
 (f) decoding options.

The different stages from image input to data stream output are illustrated in FIG. 5.

A practical system must, as far as practicable, be based on existing standards. Thus the "input" to the preferred system is based on current digital image standards, primarily the DVI standard for computer graphic images, and the SDI and HDSDI standards for video and High Definition video images. DVI itself is practically limited to an image resolution of 1600×1200 (24 bits per pixel) but it is possible to gang up multiple DVI signals to describe a larger image. Clearly any practical system must be designed to adapt to higher resolutions and new transport standards as they become available.

Electronic images are normally described by the color parameters RGB (Red, Green, Blue). In principle, therefore, any compression system must operate in triplicate; one "channel" for each color parameter. It can be convenient to use an alternative color space, generally referred to as YUV, where Y is the "luminance" or "white brightness" value, and U and V are two "color difference" values referred to collectively as the "chrominance" or "color difference" values. Although in the basic transform from RGB to YUV there is no reduction in the amount of data, in practice the human eye is less sensitive to chrominance spatial resolution than it is to luminance spatial resolution; and this fact has been used as a means of bandwidth reduction in color television since its inception.

While not limited to the use of YUV, the preferred system is based on it since this permits differential encoding rates for chrominance and luminance information, thus taking advantage of the human eye response to improve compression efficiency. While the transform between RGB and YUV is, apparently, a matter of simple arithmetic, there are pitfalls which can result in either a degradation of the image, or an increase in the amount of data.

The CCIR 601 standard defines component video by the following matrix:

$$\begin{bmatrix} Y \\ C_R \\ C_B \end{bmatrix} = \begin{bmatrix} 0.299 & 0.587 & 0.114 \\ 0.500 & -0.419 & -0.081 \\ -0.169 & -0.331 & 0.500 \end{bmatrix} \begin{bmatrix} R \\ G \\ B \end{bmatrix}$$

This matrix does not lend itself to a lossless reversible conversion, since non-integers are used as conversion factors, and so the preferred system uses the following equations, representing an approximation of the CCIR matrix, to achieve lossless reversible conversion, where $Y_r$, $U_r$ and $V_r$ are the reversible luminance and chrominance values:

$$U_r = R - G$$
$$G = Y_r - \lfloor (U_r + V_r)/4 \rfloor$$
$$V_r = B - G$$
$$R = U_r + G$$

-continued
$$Y_r = G + \lfloor (U_r + V_r)/4 \rfloor$$
$$B = V_r + G$$

In the above equations the symbol $\lfloor x \rfloor$ is referred to as the "floor" function, and is defined as the greatest integer which is less than or equal to x. The equations above have the following attributes:
 (a) if the input is RGB of N bits, then the lossless transform results in $Y_r$ also having N bits, but the components $U_r$ and $V_r$ have N+1 bits; and
 (b) when the components are then inverted the result is an RGB signal of N bits.

Two questions arose as part of the development behind the present invention:
 (a) would it be possible to absorb the creation of the extra bits in the chrominance components when applied to the wavelet transform without losing the lossless performance?
 (b) should the equations be modified to optimize performance when lossy compression is required?

A significant finding was that both the colour transform and the wavelet transform bit growth for lossless operation could be eliminated by applying the combined result to the property referred to as the property of precision preservation (PPP). Further details of this technique can be found in "An Approach to the Integer Wavelet Transformations for Lossless Image Compression" by Hongyang Chao, Paul Fisher and Zeyi Hua, December 1997. However, both the equations above and the PPP technique apply only to lossless transforms.

Where lossy compression is required, an alternative technique is used. Here the aim is simply to preserve the original range and ensure that there is no bit growth. This is achieved using the following equations:

$$U_r = \lfloor (R - G)/2 \rfloor$$
$$G = Y_r - \lfloor (U_r + V_r)/2 \rfloor$$
$$V_r = \lfloor (B - G)/2 \rfloor$$
$$R = 2U_r + G$$
$$Y_r = G + \lfloor (U + V)/2 \rfloor$$
$$B = 2V_r + G$$

It would therefore be desirable to provide methods of image data compression, both spatial and temporal, which permit efficient encoding of the data and which can be either lossless or lossy.

In accordance with a first aspect of the present invention there is provided a method of encoding an input sequence of data bits by forming a tree structure, the method comprising:
 (a) forming groups of data bits from the input sequence and logically combining the data bits within each group to form a sequence of first-stage logic output bits;
 (b) repeating step (a) iteratively, by forming groups of logic output bits from the first-stage logic output bits and logically combining logic output bits within each group to form a sequence of intermediate logic output bits, until there is a single final logic output bit;
 (c) generating an encoded output bit stream comprising said final logic output bit and any or all of the logic output bits and any or all of the data bits of the input data sequence, in dependence on at least a first exclusion condition that, if a given logic output bit is equal to a first predetermined value, which uniquely defines the data bits and any logic output bits which have been used to generate said given logic output bit, then said uniquely-defined data bits and said uniquely-defined logic output bits are excluded from said output bit stream.

This provides a convenient way of encoding data and which, in certain circumstances, permits a high degree of lossless compression.

The data bits and the logic output bits may be so combined using a logical OR combination, in which case the first predetermined value is 0. It will be appreciated that, an alternative arrangement would be to provide a logical AND combination, in which case the first predetermined value would be 1.

This method is particularly advantageous when the number of data bits in the sequence which are equal to the predetermined value (e.g. 0) is expected to be sufficiently more than the number of data bits which are equal to the logically opposite value (e.g. 1), such that the resulting encoded output bit stream comprises fewer bits than the input sequence of data bits. This provides an efficient method of lossless compression.

The input sequence of bits may comprise one of a plurality of rows of bits which collectively define a bit plane of a transformed block of image data, a bit plane being defined as a plane formed from the respective bits of equal significance within the transformed block of image data.

In this case, steps (a) and (b) may be applied to each of the rows of said bit plane, thereby generating, for each row, a respective single final logic output bit which constitutes a row output bit, and the method further comprises forming a further row tree structure by:

(i) forming groups of said row output bits and logically combining the row output bits within each group to form a sequence of first-stage row logic output bits;

(ii) repeating step (i) iteratively, by forming groups of row logic output bits from the first-stage row logic output bits and logically combining the row logic output bits to form a sequence of intermediate row logic output bits, until there is only a single final row logic output bit; and wherein the resulting output bit stream comprises:
   said final row logic output bit;
   any or all of the first-stage or intermediate row logic output bits; and
   any or all of the row output bits, in dependence on a second exclusion condition that, if a given row logic output bit is equal to said first predetermined value, which uniquely defines the row logic output bits and any row output bits which have been used to generate said given logic output bit, then said uniquely-defined row logic output bits and said uniquely-defined row output bits are also excluded from said output bit stream.

Each group of said row output bits comprises five row output bits. This provides a particularly efficient method of encoding, since five row output bits can effectively by processed in parallel.

However, not all of the row output bits are necessarily formed into groups, in which case those row output bits which are not so grouped are combined with other row logic output bits within the row tree structure.

The resulting output bit stream preferably additionally comprises some or all of the non-grouped row output bits, in dependence on an additional exclusion condition that, for each non-grouped row output bit, if the row logic output bit, which results from the logical combination of that non-grouped row output bit with the other row logic output bits with which they are combined in the row tree structure, is not equal to said first predetermined value, then that non-grouped row output bit is excluded from the output bit stream, but all of the intermediate logic output bits which were logically combined to form that non-grouped row output bit are included. Again, this provides an efficient way in which the data can be compressed during encoding.

If the transformed block of image data has been transformed using a multi-level wavelet transform, the row output bits may be grouped in step (i) in accordance with the level of the transform to which they relate.

In this case, the row output bits of the first and second levels may be grouped together in step (i), and the row output bits of the third level may be grouped with the first-stage row logic output bits.

In accordance with a further aspect of the present invention there is provided a method of encoding a transformed image data block which comprises an array of transformed image coefficients configured as a plurality of bit planes, by forming the data bits from each bit plane as a respective sequence of data bits and applying such a method to the bit sequences of each bit plane, starting with the most significant bit plane and ending with the least significant, so as to derive an encoded output bit stream representing the entire transformed data bock.

The transformed image data block may additionally comprise a bit plane in which the signs of the transformed image data have been encoded, and wherein the method further comprises incorporating in said output bit stream bits representing the respective signs associated with the most significant data bit of each of the transformed image coefficients.

This method may be subject to a further exclusion condition that, for each logic value which is equal to a second predetermined value, such as 1, the corresponding logic values in the same position within the corresponding row tree structure associated with each succeeding bit plane are excluded from the encoded output bit stream, but wherein the logic values or data bits immediately preceding said corresponding logic values are retained, even if they would otherwise have been excluded by said first exclusion condition.

This provides a further efficient way of compressing the data in a lossless manner.

The encoded output bit stream is preferably additionally subject to a compression exclusion condition in which bits occupying predetermined positions within the or each tree structure are excluded from said encoded output bit stream in accordance with a predetermined compression profile. This enables a predetermined lossy compression to be applied within the encoding process.

The compression profile may be defined for each of said bit planes so as to exclude a greater number of bits from the bit planes of lower significance than those from the bit planes of greater significance.

Alternatively, or in addition, the compression profile may be defined so as to exclude a greater number of row logic output bits generated in earlier stages of step (ii) than those generated in the later stages thereof.

The output bit stream may comprise, for each bit plane in sequence starting with the bit plane of greatest significance and ending with the bit plane of least significance: the non-excluded row output bits, followed in sequence by: (a) the row logic output bits; (b) the non-excluded intermediate logic output bits; and (c) the non-excluded data bits. This feature enables the data to be decoded efficiently.

In this case, the output bit stream preferably further comprises, for each bit plane: (d) the bits representing the respective signs associated with the most significant data bit of each of the transformed image coefficients.

The invention extends to a method of decoding a bit stream which has been encoded using the above method in which the bits which have been excluded by any exclusion condition are regenerated so as to recreate the original input sequence of data bits from which the bit stream has been encoded.

In accordance with a further aspect of the present invention there is provided a method of preventing the creation of blocking artefacts during the transformation of image data, the method comprising: receiving an original set of data relating to an image in the form of an array of adjoining blocks; and processing the data of each block, together with data of each immediately adjacent block within the array, in accordance with a predetermined transformation algorithm, thereby to create a respective block of transformed data which is substantially devoid of block boundary artefacts.

The transformed data in each of the blocks are preferably compressed separately. This, in turn, means that the resulting compressed blocks can be decompressed separately, and this permits a selection of only some compressed blocks to be made for decompression.

The method preferably further comprises transmitting sequentially the blocks of compressed data.

The present invention extends to receiving the transmitted blocks of compressed data and sequentially decompressing each block to recreate said transformed data.

The method preferably further comprises processing said recreated transformed data in accordance with a reverse algorithm so as to recreate the original set of data.

The original set of data may constitute the pixels of an entire frame of an image signal, wherein each block may comprise 1,024 pixels.

In accordance with a further aspect of the present invention there is provided a method of recreating an original set of data relating to an image in the form of an array of adjoining blocks which has been processed in accordance with the above method to create blocks of transformed data, the method comprising processing each block of transformed data in accordance with an algorithm which is an inverse of said predetermined transformation algorithm, thereby to recreate the data of each block, together with data of each immediately adjacent block within the array, and combining the resulting processed blocks thereby to recreate the original image.

The predetermined transformation algorithm may comprise a wavelet transform, such as the 2/10 transform.

In accordance with a further aspect of the present invention there is provided a method of performing a first transformation on each of a first and a second data group to generate first and second transformed data groups respectively, and performing a plurality of subsequent transformations on each of the first and the second data group, the method comprising, in sequence: performing said first transformation on said first data group using a first transform engine; and performing all of said subsequent transformations on said transformed first data group using a second transform engine within a time interval which at least partly overlaps a time interval within which said first transform engine performs said first transformation on said second data group.

This provides a particularly efficient method of effecting a multi-level transform, since only two transform engines are required.

The time taken to perform all of said subsequent transformations on a transformed data group is preferably less than or equal to the time taken to perform the first transformation thereon. This provides the advantage that the subsequent transformation steps do not give rise to any delay in the overall multi-level transformation method.

The method preferably further comprises storing the transformed data resulting from each transformation on said first data group in a first memory storage area, and storing the transformed data resulting from each transformation on said second data group in a second memory storage area, and, when applied to a plurality of further data groups, the data resulting form each transformation on the or each further odd-numbered data group are preferably stored in the first memory storage area, and the transformed data resulting from each transformation on the or each further even-numbered data group are preferably stored in the second memory storage area. Such an arrangement requires only two memory storage areas, even though a multi-level transform is performed.

After each of said subsequent transformations the resulting transformed data are preferably stored in their respective memory storage area so as to overwrite at least some of the data already stored therein resulting from one or more previous transformations.

In accordance with a further aspect of the present invention there is provided a method of performing a plurality of transformations on first and second data groups, the method comprising, in sequence:
  (a) performing a first transformation on said first data group using a first transform engine, so as to generate a first once-transformed data group;
  (b) storing said first once-transformed data group in a first memory storage area;
  (c) reading said first once-transformed data group from said first memory storage area;
  (d) performing a second-stage transformation thereon using a second transform engine, thereby generating a first twice-transformed data group; and
  (e) writing said first twice-transformed data group into said first memory storage area so as to overwrite said first once-transformed data group;
the method further comprising, in sequence:
  (f) performing said first transformation on said second data group using said first transform engine, so as to generate a second once-transformed data group;
  (g) storing said second once-transformed data group in a second memory storage area;
  (h) reading said second once-transformed data group from said second memory storage area;
  (i) performing said second-stage transformation thereon using said second transform engine, thereby generating a second twice-transformed data group; and
  (j) writing said second twice-transformed data group into said second memory storage area so as to overwrite said second once-transformed data group;
  wherein step (f) commences after the completion of step (a) but before the completion of step (e).

Step (f) preferably commences before the completion of step (c).

Steps (a) to (j) may be repeated using a multiplicity of data groups, in which case steps (a) to (e) are applied to odd-numbered data groups and steps (t) to (j) are applied to even-numbered data groups.

The method preferably further comprises, in sequence, after step (e):
  ($e_1$) reading a sub-group of said first twice-transformed data group from said first memory storage area;
  ($e_2$) performing a third-stage transformation thereon using said second transform engine, thereby generating a first three-times-transformed data sub-group; and ($e_3$) writing said first three-times-transformed data sub-group into said first memory storage area so as to overwrite said sub-group of said first twice-transformed data group;

and, after step (j):

($j_1$) reading a sub-group of said second twice-transformed data group from said second memory storage area;

($j_2$) performing a third-stage transformation thereon using said second transform engine, thereby generating a second three-times-transformed data sub-group; and ($j_3$) writing said second three-times-transformed data sub-group into said second memory storage area so as to overwrite said sub-group of said second twice-transformed data group.

The time taken to perform the combination of steps (c) to ($e_3$) is preferably less than or equal to the time taken to perform step (a), and the time taken to perform the combination of steps (h) to ($j_3$) is less than or equal to the time taken to perform step (f).

The method preferably further comprises, in sequence, after step ($e_3$):

($e_4$) reading said first three-times-transformed data sub-group from said first memory storage area;

($e_5$) performing a fourth-stage transformation thereon using said second transform engine, thereby generating a first four-times-transformed data sub-group;

($e_6$) writing said first four-times-transformed data sub-group into said first memory storage area so as to overwrite said first three-times-transformed data sub-group;

and, after step ($j_3$):

($j_4$) reading said second twice-transformed data group from said second memory storage area;

($j_5$) performing a fourth-stage transformation thereon using said second transform engine, thereby generating a second four-times-transformed data sub-group; and ($j_6$) writing said second four-times-transformed data sub-group into said second memory storage area so as to overwrite said second three-times-transformed data sub-group.

The time taken to perform the combination of steps (c) to ($e_6$) is preferably less than or equal to the time taken to perform step (a), and the time taken to perform the combination of steps (h) to ($j_6$) is less than or equal to the time taken to perform step (f).

The method preferably further comprises repeating steps ($e_3$) to ($e_6$) and steps ($j_3$) to ($j_6$) a plurality of times, using the transformed sub-groups stored in the respective memory storage areas, wherein each even-numbered transformation is performed on only a sub-group of the data stored in the memory and each odd-numbered transformation is performed on all of the data generated in the preceding even-numbered transformation step.

The data groups may be subjected to ten transformations, which will be the case with a five-level wavelet transform, in which each level requires two separate transformation steps.

The plurality of transformations may collectively comprise a multi-level wavelet transform, such as the Haar wavelet transform or the 2/10 wavelet transform.

Each data group may comprise a frame of image data.

In accordance with a further aspect of the present invention there is provided a method of performing a plurality of reverse transformations on first and second data groups which have been transformed in accordance with a method as defined above, the method comprising, in sequence: performing all but the last one of the reverse transformations on said first transformed data group using a first reverse transform engine; and performing the last reverse transformation on said first transformed data group using a second reverse transform engine within a time interval which at least partly overlaps a time interval within which said first reverse transform engine performs all but the last one of the reverse transformations on said second transformed data group.

The time taken to perform said all but the last one of the reverse transformations on said first transformed data group is preferably less than or equal to the time taken to perform the last reverse transformation on said first data group.

In accordance with a further aspect of the present invention there is provided a method of transmitting data comprising: grouping the data into a sequence of frames comprising a first frame and at least one subsequent frame, each frame comprising a predetermined plurality of data blocks; transmitting the first frame in its entirety; and transmitting only those data blocks within the or each subsequent frame which are significantly different from the corresponding data block within the first frame, each such data block being transmitted in combination with a respective index number which defines the position of the block within the frame.

This method provides an enormous advantage over existing systems of transmitting image data, in which information concerning the difference between sequential image frames is transmitted in order to reconstruct the desired image frames. In the event of a transmission error, the error would in this case continue until a further complete frame is transmitted. In contras, with the above method, only those blocks which have changed between consecutive frames are transmitted, and these are used to create the desired subsequent frames.

The method preferably further comprises: processing each of said data blocks in accordance with a predetermined algorithm to evaluate a parameter for that data block; for each data block within the or each subsequent frame, determining if the value of the associated parameter is significantly different from the corresponding data block of the preceding frame within the sequence; wherein the step of transmitting only those data blocks which are significantly different comprises transmitting only those data blocks within the or each subsequent frame for which there has been a positive determination. This feature effectively provides a method of "thresholding" the measured differences between blocks of sequential frames, so that only those blocks which exhibit a significant difference are transmitted.

The step of grouping the data may comprise grouping the data into a plurality of said sequences, each containing n frames, where n is a predetermined number, such that at least one entire frame is transmitted within each sequence of n consecutive frames of data.

The method preferably further comprises transmitting an additional entire frame at regular intervals.

The method preferably further comprises transmitting an additional entire frame on receipt of a demand signal.

The present invention extends to a similar method in which the data are compressed, the method comprising grouping the data into a sequence of frames comprising a first frame and at least one subsequent frame, each frame comprising a predetermined plurality of data blocks; compressing the first frame in its entirety; and compressing only those data blocks within the or each subsequent frame which are significantly different from the corresponding data block within the first frame, each such data block being compressed in combination with a respective index number which defines the position of the block within the frame.

If the data to be compressed has been subjected to a wavelet transform, the parameter may usefully be evaluated on the basis of only the most significant coefficient within each sub-band in each data block. In this case, the parameter is preferably evaluated on the basis of the position within the data block of the most significant coefficient, and may be evaluated on the basis of only the n most significant coefficients selected from the group comprising the most significant coefficient within each sub-band in each data block, where n is a predetermined number. In this case, n may be equal to 8.

The wavelet transform may be a five-level transform resulting in 16 sub-bands.

The method preferably further comprises transmitting only the compressed data.

If the data comprises colour image data, then it is preferable that only the luminance component of the colour image data is processed in order to evaluate said parameter.

Preferably only those components of the data within each data block having values higher than a predetermined threshold are processed to evaluate the parameter for that data block.

In accordance with a further aspect of the present invention there is provided a method of configuring a plurality of variable-length data blocks into a data stream from which each data block can subsequently be retrieved, wherein each data block maps to a block of pixels within a frame of image data, the method comprising: for each data block, forming a respective indexed data block comprising: a sync word which is identical for each indexed data block; an index number which uniquely identifies the data block within said plurality of data blocks; and the respective data block.

This method enables variable-length blocks to be recreated from a data stream without the need for the length of each block to be defined in a header section.

Each indexed data block preferably comprises, in sequence, said sync word, said index number and said respective data block.

The sync word preferably comprises a sequence of 16 bits and/or a sequence of bits equal to 1.

Preferably all of the index numbers comprise bits sequences of equal length, such as 11 bits in length, which enables 2048 different data blocks to be uniquely identified.

Each of the data blocks may comprise a data block which has been transformed in accordance with a wavelet transform.

The present invention extends to a method of retrieving variable-length data blocks from a data stream, the data blocks having been configured in accordance with the above method, the method comprising locating said sync word within said data stream thereby to identify said data blocks; and retrieving the resulting identified data blocks from said data stream.

Each of the data blocks may have a characteristic which enables it to be verified as a valid data block, in which case the data stream is searched sequentially for a data sequence which is identical to said sync word, thereby to identify a potential indexed data block comprising a potentially valid data block, and validating said data block only: (a) if it is verified by said characteristic to be a valid data block; and (b) if the potential indexed data block is followed immediately within the data stream by a further potential indexed data block comprising a data sequence which is identical to said sync word.

The method preferably further comprises selecting for a subsequent processing step only those data blocks which have been validated. If the data stream comprises data corresponding to an image to be displayed, then the processing step comprises displaying the resulting selected data blocks.

The present invention extends to a method of selecting a region of interest from within a plurality of variable-length data blocks which have been retrieved in accordance with the above method, in which only those retrieved variable-length data bocks which are associated with one or more predetermined index numbers are selected. This provides a particularly advantageous way in which data, such as relating to a particular position within an image, can be selected, e.g. for display, from a data stream.

Preferred embodiments of the present invention will now be described in detail, with reference to the accompanying drawings, in which:

FIG. 8 shows an example of a pixel array for illustrating the operation of the transforms;

FIG. 9 illustrates the result of applying Equations 1 and 2 to the array of FIG. 8 in which the equations have been solved in the range r=0 . . . 9 and c=0 . . . 4;

FIG. 10 illustrates the result of applying Equations 5, 6, 9 and 10 to the horizontal transform data shown in FIG. 9 in which the range is r=0 . . . 4 and c=0 . . . 4, representing the Haar Transform for the example pixel array;

FIG. 11 illustrates the results of applying the 2/10 transform equations to the sample pixel array;

Figure 16:
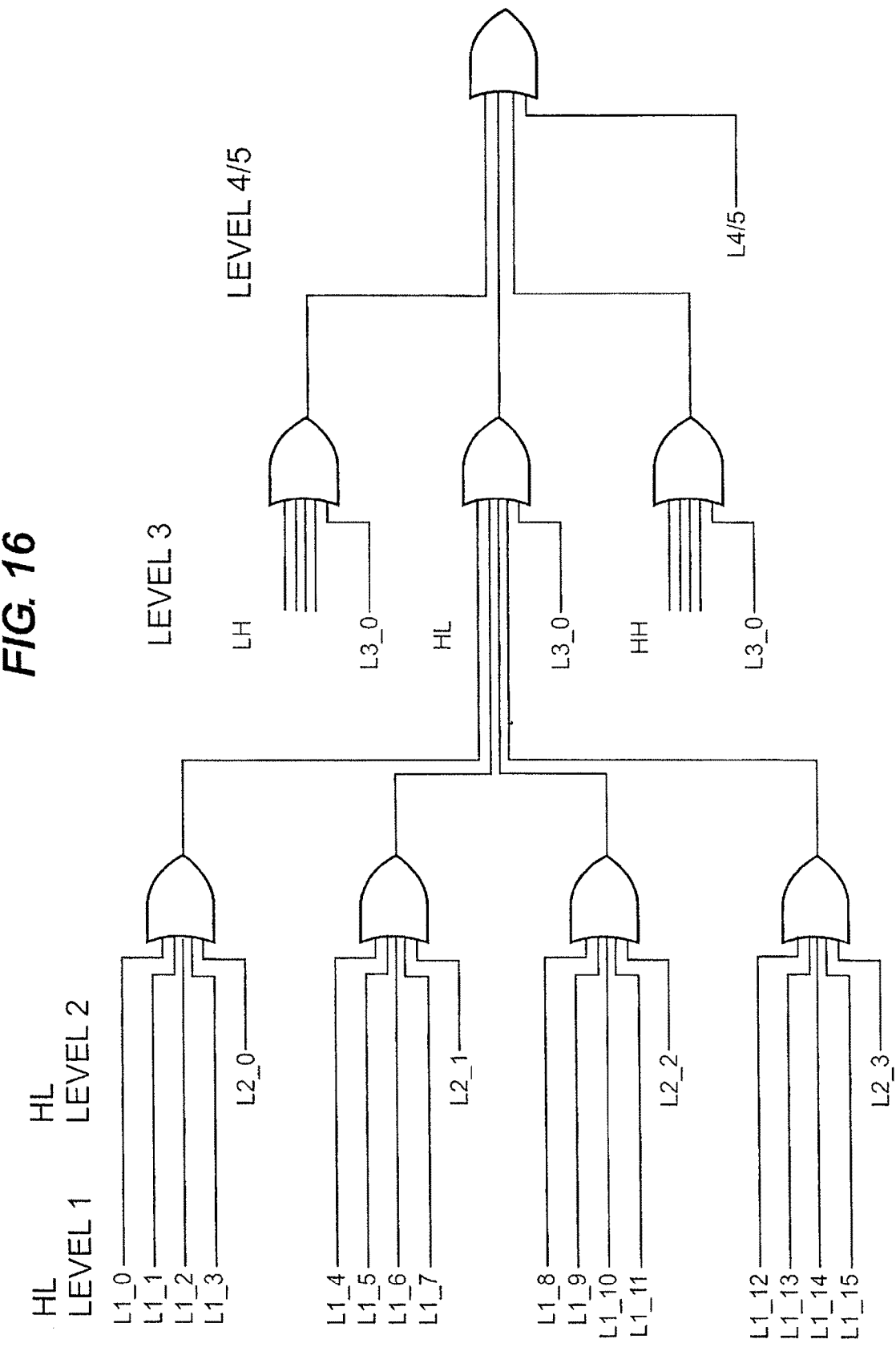
Figure 17:
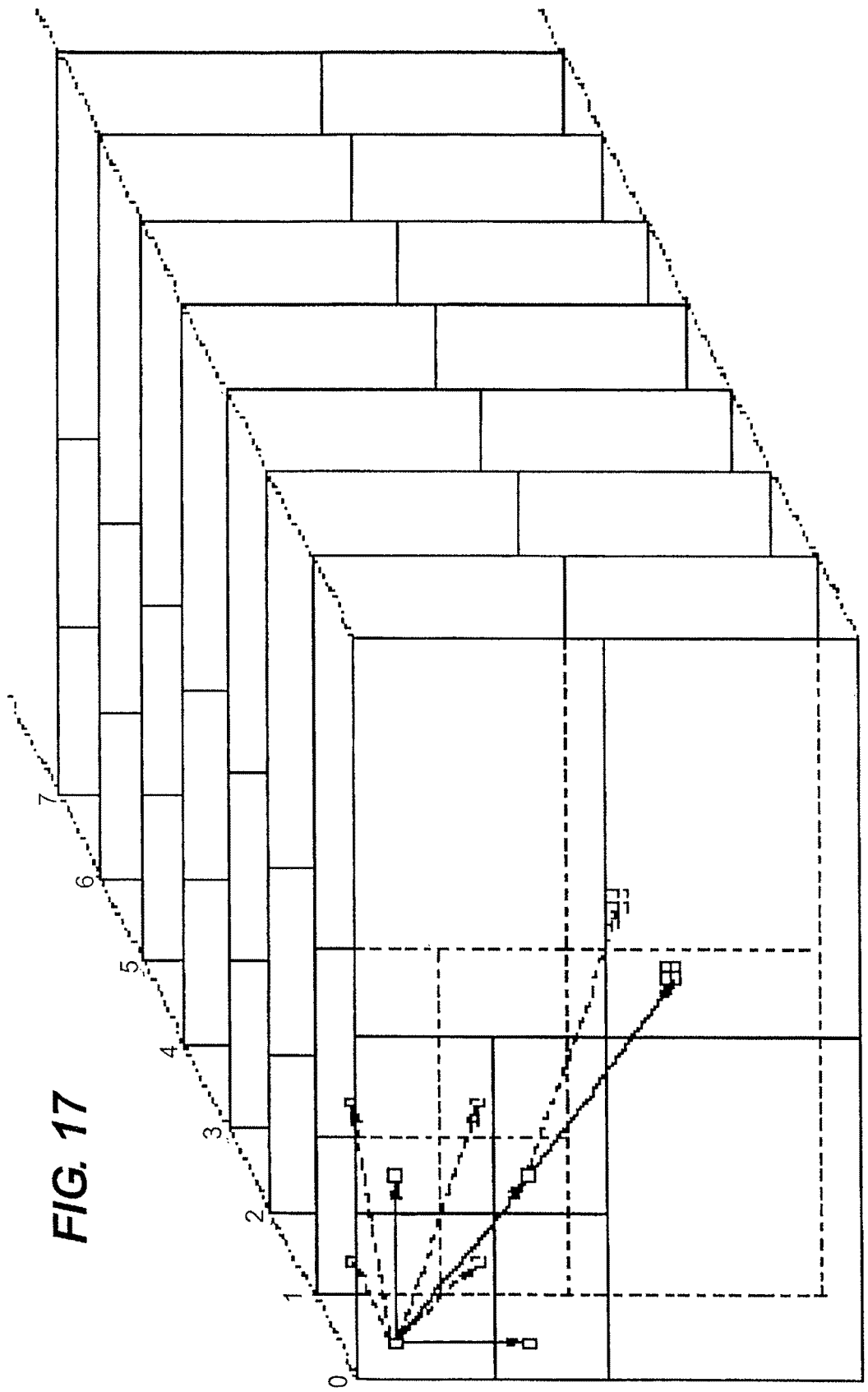
Figure 18:
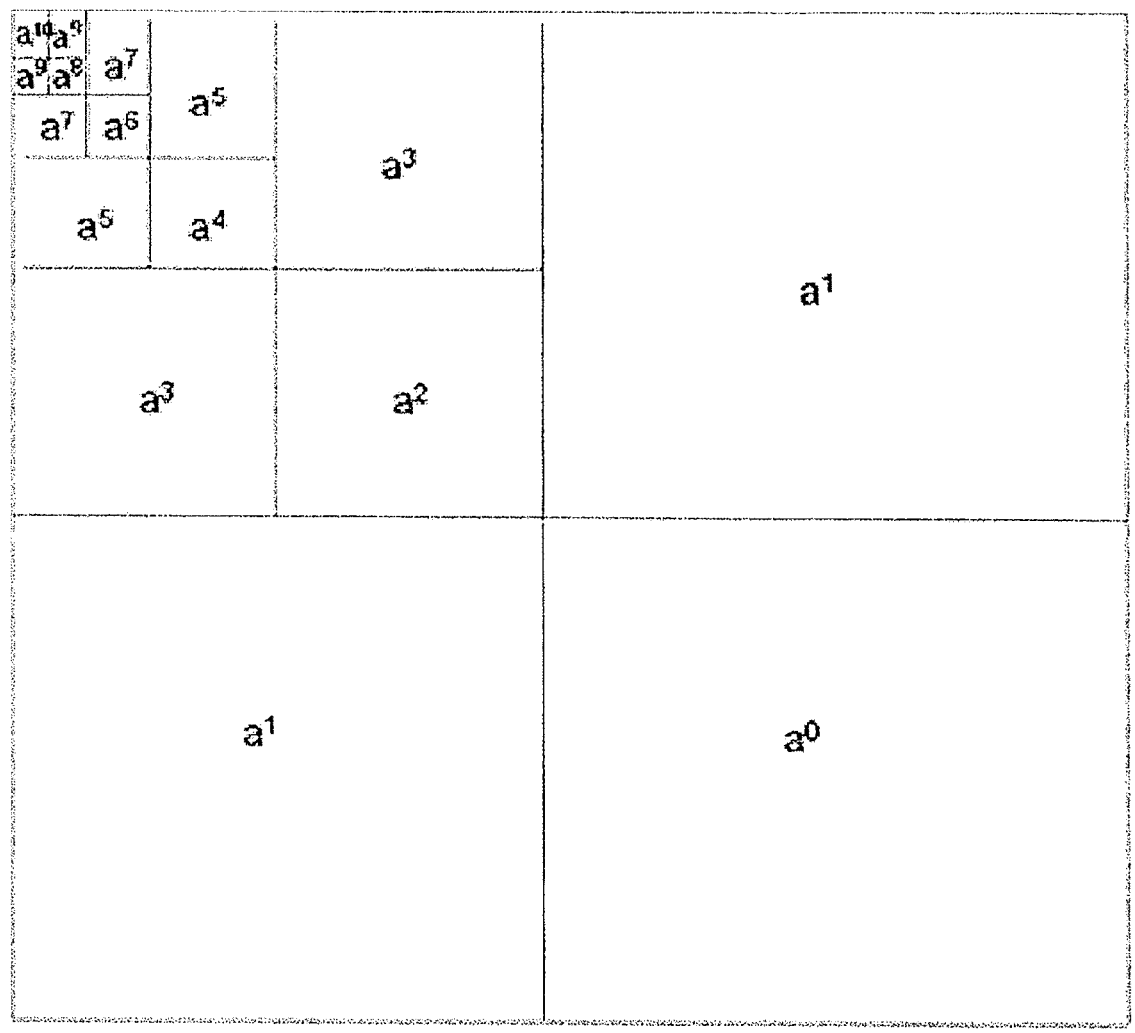
Figure 20:
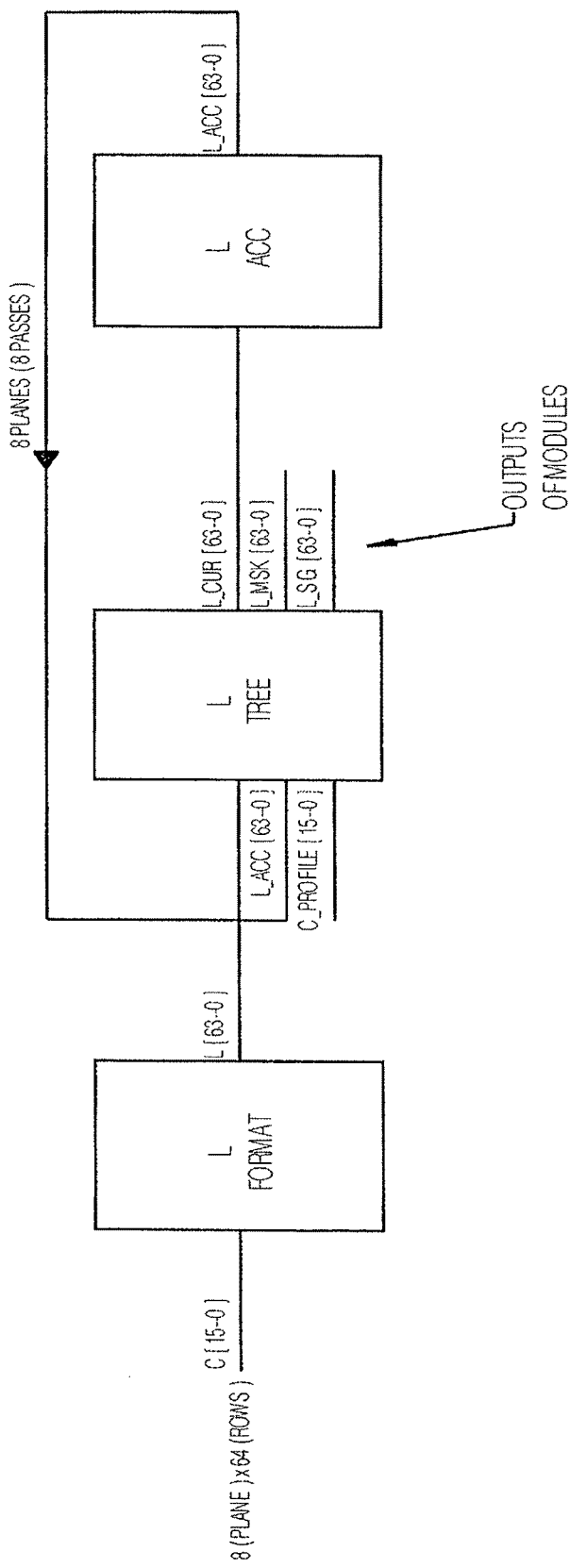
Figure 21:
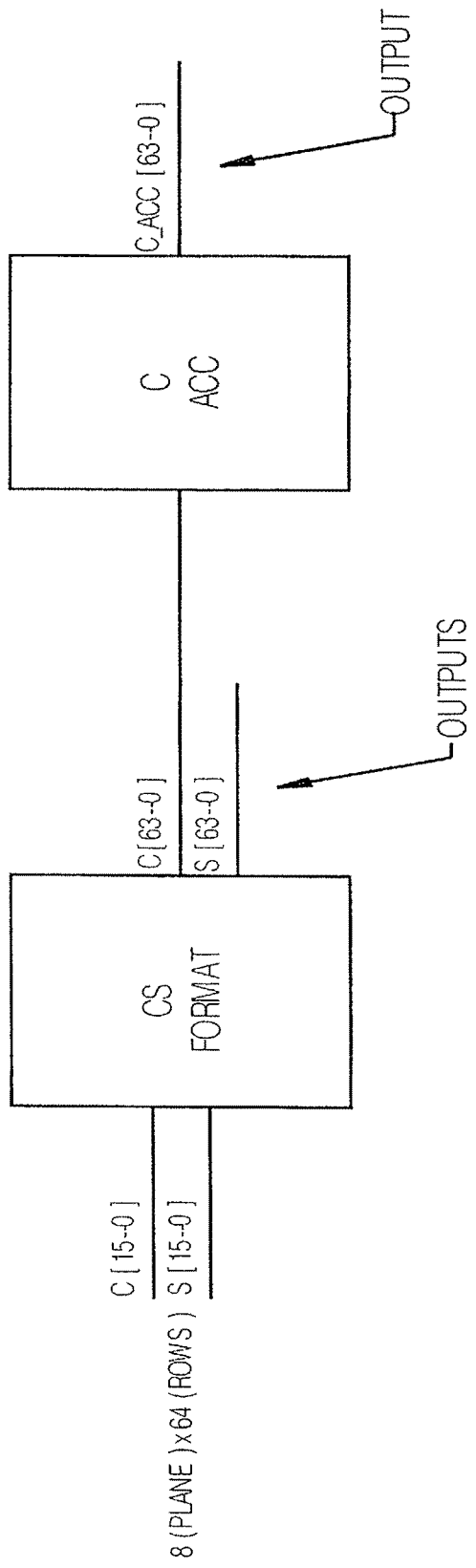
Figure 22:
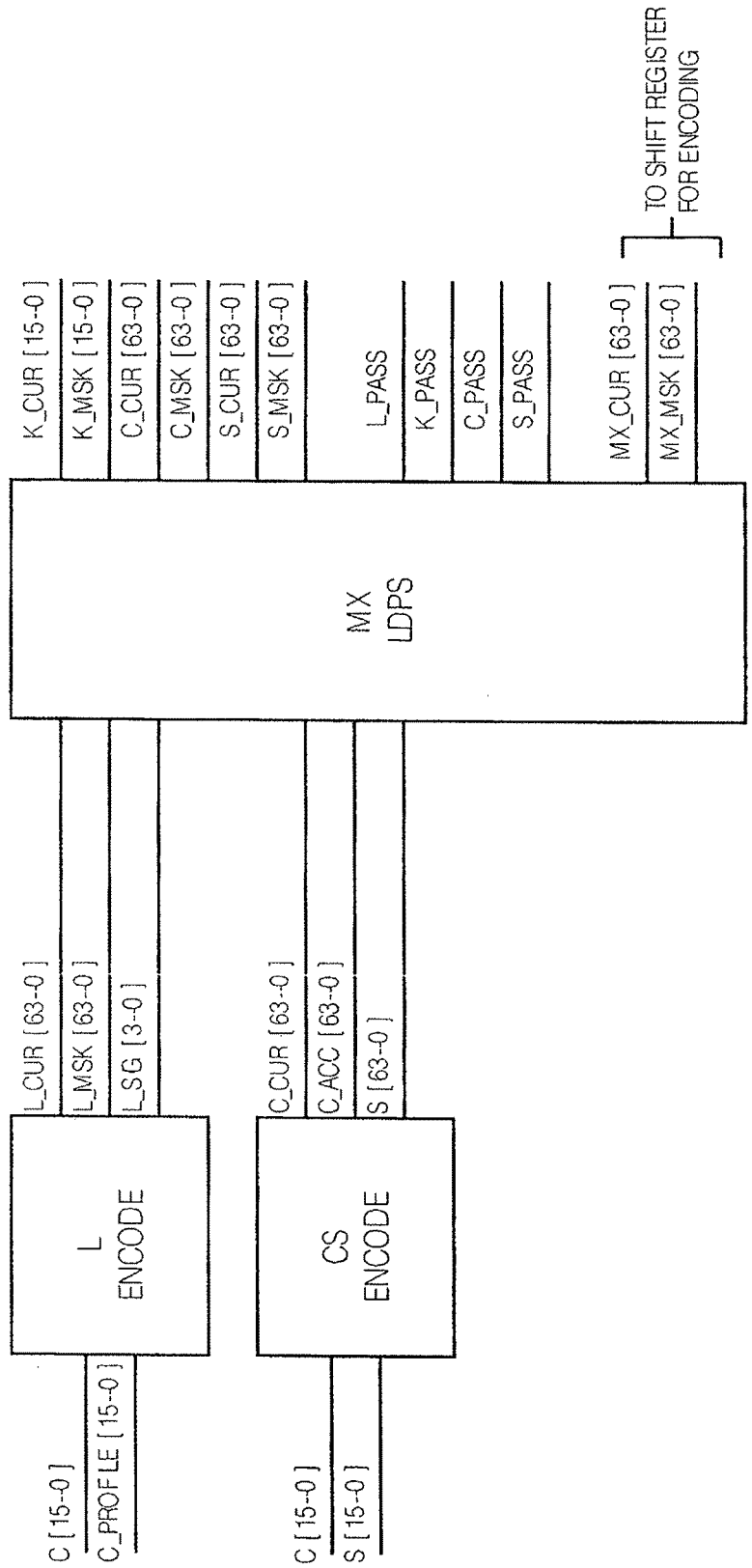
Figure 23:
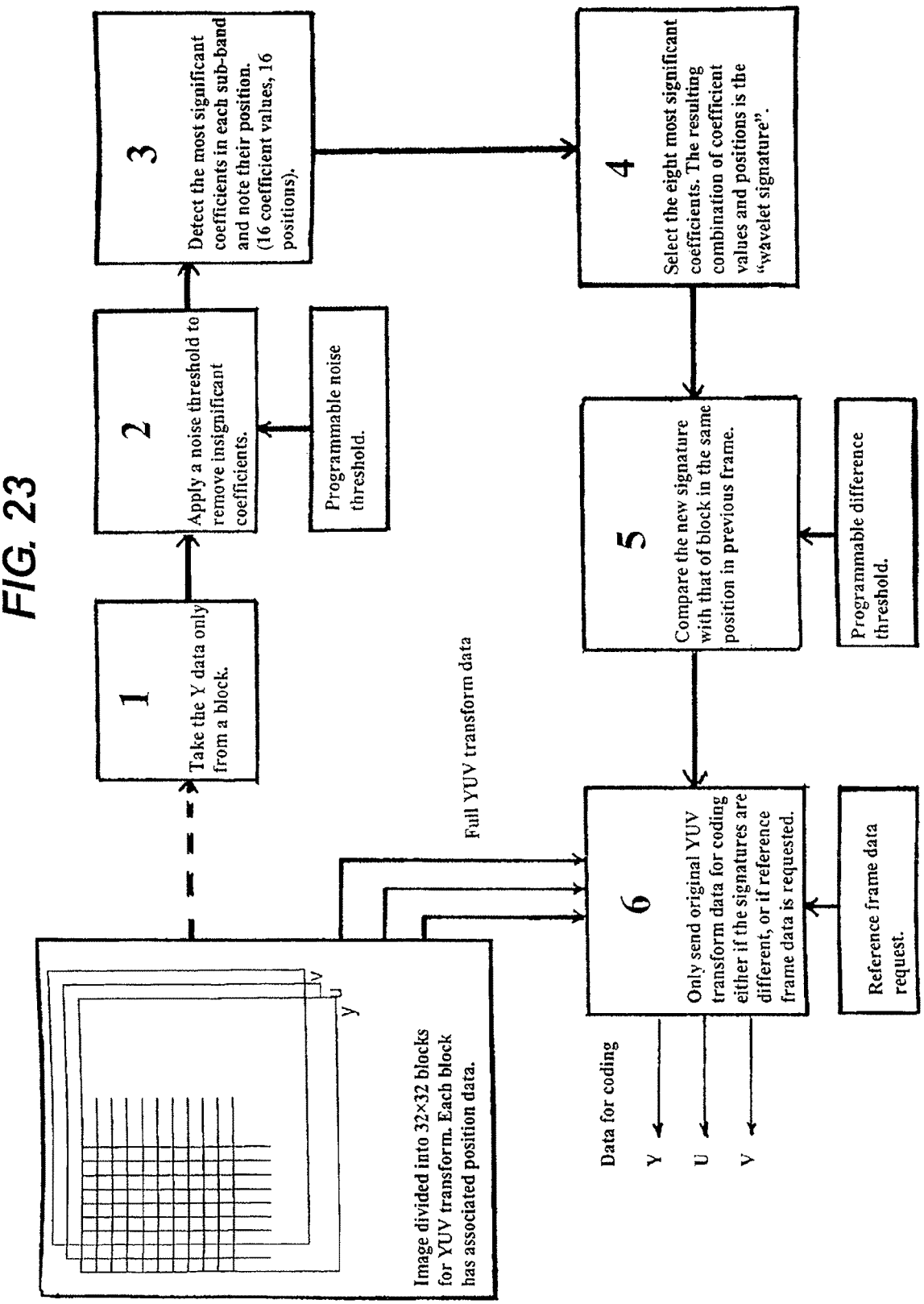
Figure 24:
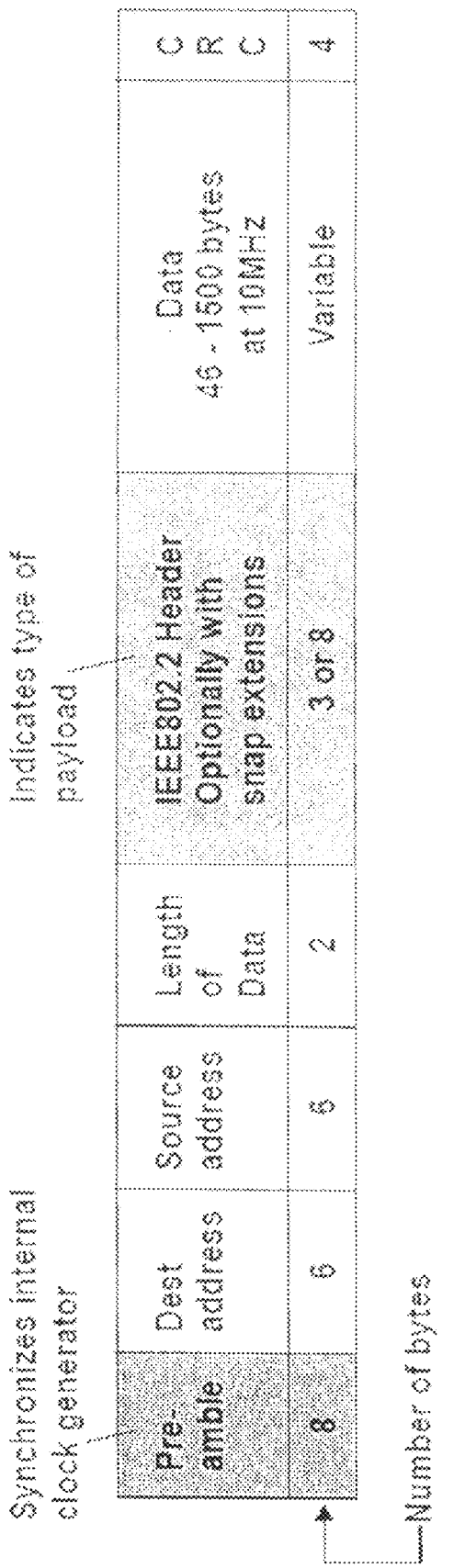
Figure 25:
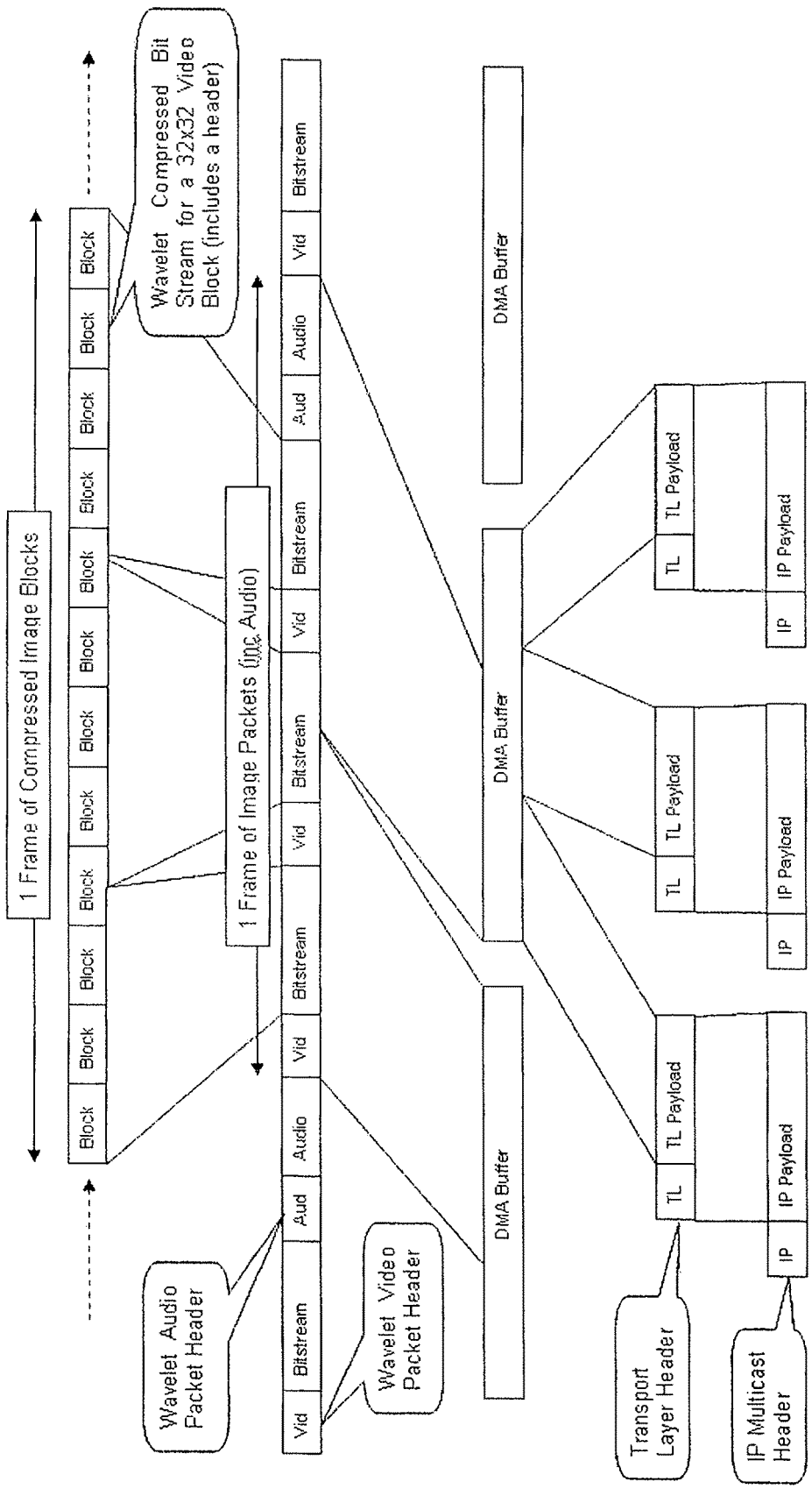
Figure 26:
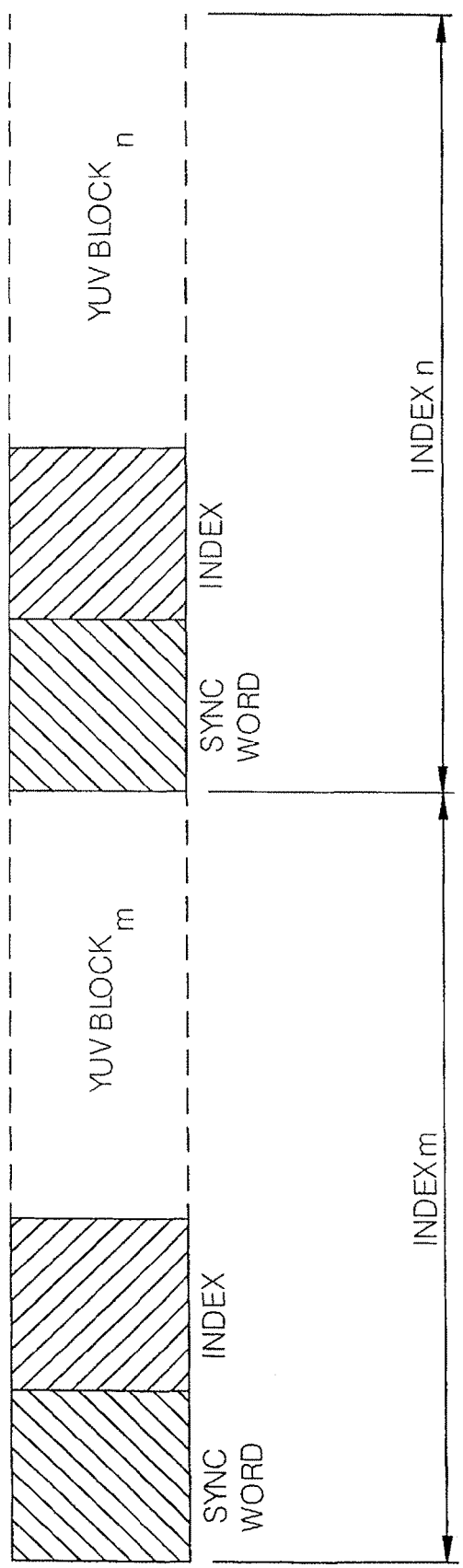

FIG. 16 illustrates an L-tree made up from 64 L-types, in which 24 are shown as "L boxes" on the diagram, the other 40 being implied as children of the Level 3 LH and HH L-types);

FIG. 17 illustrates the concept of eliminating coding loss by examining all eight data planes as a composite;

FIG. 18 illustrates the concept of the weighting factor applied to a five-level transform, in which typically a=2;

FIG. 19 illustrates how the organisation of the coefficient data in one bit plane is related directly to the wavelet transform;

FIG. 20 illustrates the preferred L encoder;

FIG. 21 illustrates the preferred CS encoder;

FIG. 22 illustrates the LKCS pass;

FIG. 23 is a diagrammatic representation of the preferred temporal encoding process;

FIG. 24 illustrates the IEEE 802.3 frame format used in standard Ethernet;

FIG. 25 illustrates the translation of the compressed image stream into IP packets; and FIG. 26 shows a part of the bit stream, showing two consecutive image blocks with their associated sync words and index numbers that identify the block position within the image.

THE WAVELET TRANSFORM ENGINE

A significant advantage of the preferred design is that it is able to use the same "engine" for both deconstruction and reconstruction of the image. It uses an architecture that consists of a single filter bank that carries out a five-level transform in two dimensions in real time.

From the above, it can be seen that the use of a five-level transform results in data that describe a 32×32 pixel block. However, if this were literally the case at the encoding stage, the end result could be "blocky" images (especially at high compression ratios). In order to ensure that data relating to pixels at the edge of a block fully takes into account the energy of pixels in a neighboring block, the transform process must "sweep" across the whole pixel array. Thus, while the resulting data is, indeed, formatted as representing a series of 32×32 blocks, the image information so derived is not itself block-based.

Figure 6:
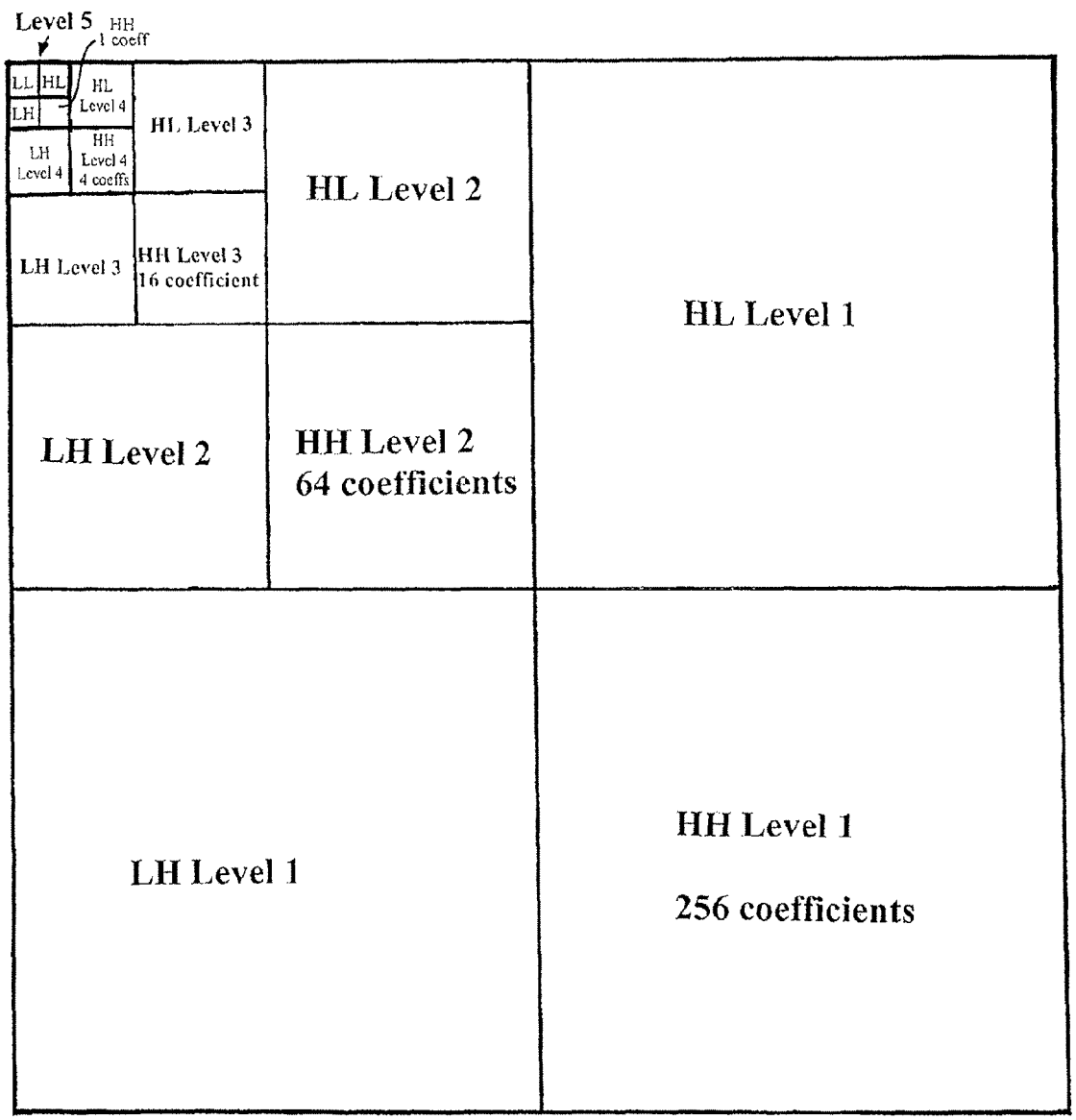
FIG. 6 illustrates five-level decomposition.

FIG. 6 shows the aim of the five-level transform process. There are 16 coefficients at Level 3, four at Level 4 and one at Level 5. There are several ways wavelet transforms can decompose a signal into various sub-bands. These include uniform decomposition, octave-band decomposition, and adaptive or wavelet-packet decomposition. Out of these, octave-band decomposition is the most widely used. This is a non-uniform band splitting method that decomposes the lower frequency part into narrower bands and the high-pass output at each level is left without any further decomposition.

In order to allow the system to be optimized to different source material, the preferred system is set up to use two different wavelet transforms. The Haar transform is used for material where the definition of sharp discontinuities or "edges" needs to be precise, and the "Two/Ten" or TT transform is provided as an alternative for moving video images where a "smooth" result is more pleasing.

The Haar transform is best for the compression of graphics images where it is of great importance that the integrity of sharp discontinuities (in practice thin lines etc.) is maintained. When moving video images are involved, there are benefits in using a different transform, and the preferred system allows a choice between the Haar transform and the "Two-Ten" (or TT, or 2/10) transform depending on the type of images being used.

Under severe compression there is a tendency for image artifacts to appear at block boundaries when the image is reconstructed. The 2/10 transform processes more pixels in the high pass filter, and this has the effect of "smoothing" the image, giving a visually more acceptable result on video content.

Figure 1:
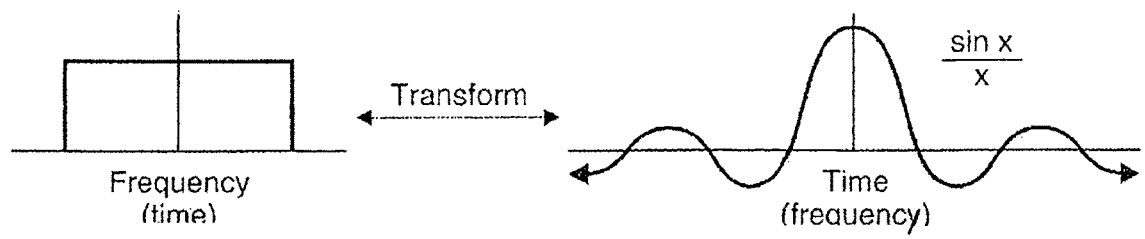
FIG. 1 illustrates an example of a "transform pair"
Figure 2:
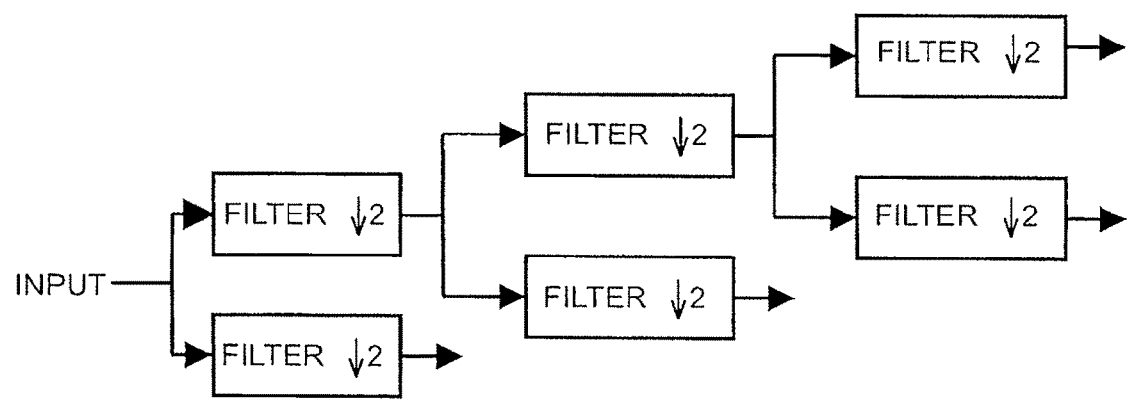
FIG. 2 illustrates how the wavelet transform is achieved using a set of filters in cascade.
Figure 3:
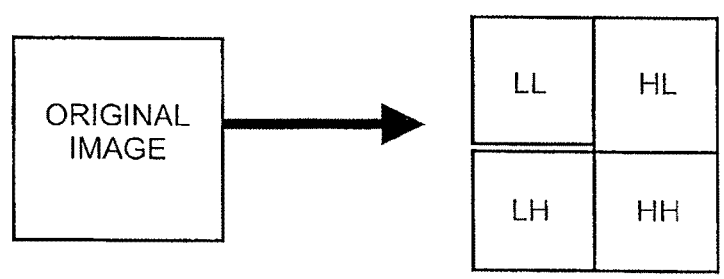
FIG. 3 shows a single-stage wavelet decomposition.
Figure 4:
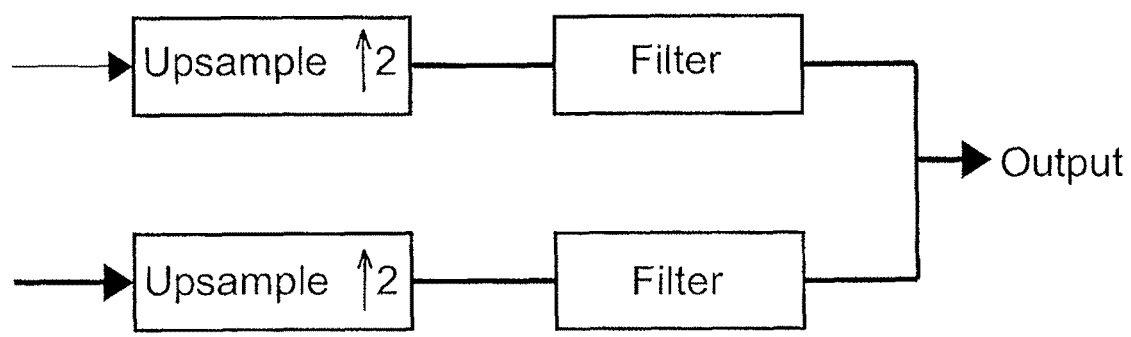
FIG. 4 shows a single-stage wavelet reconstruction in a decoder.
Figure 7:
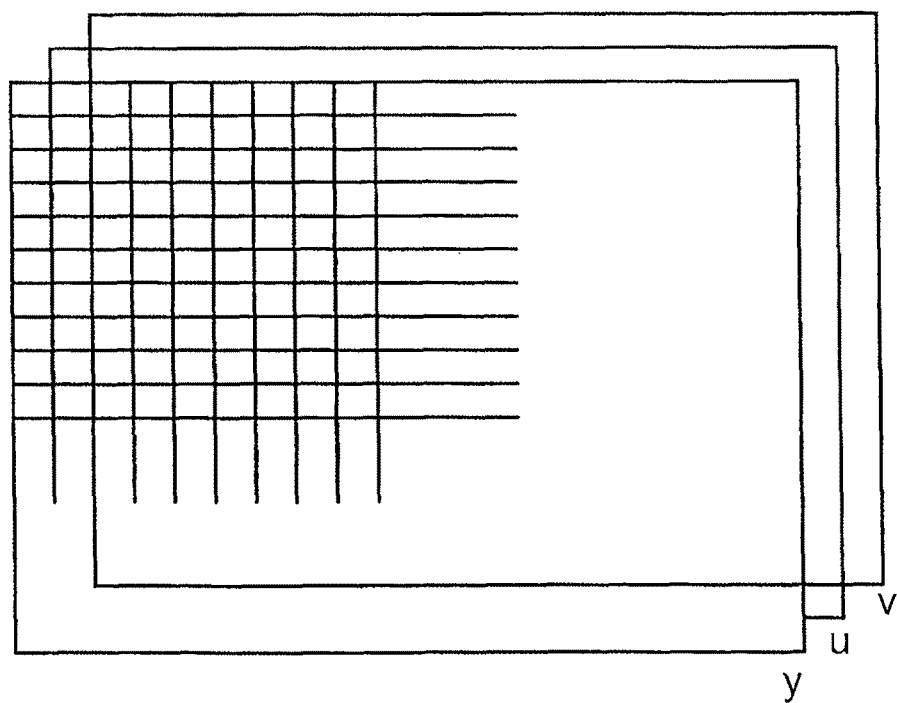
FIG. 7 illustrates a block-based Haar transform.
Figure 5:
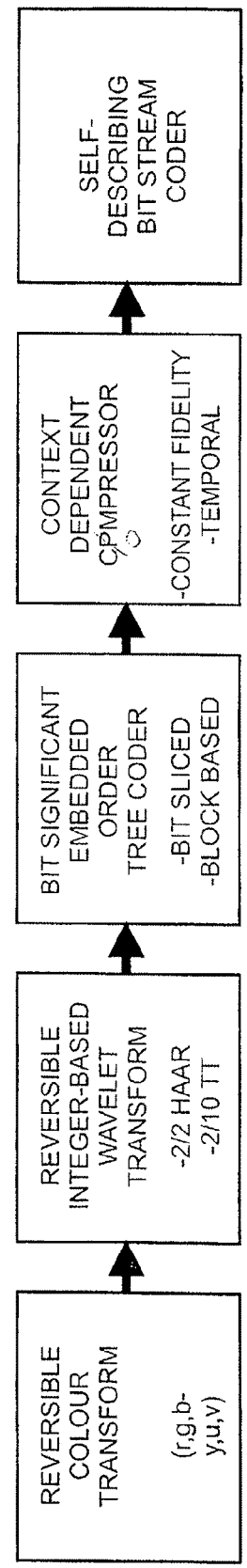
FIG. 5 illustrates processes within the preferred encoder.

In the block-based Haar transform the image is processed in 32×32 pixel blocks, with one block for each of Y, U and V. This is shown pictorially in FIG. 7. In practice the pixels are processed as 16×16 non over-lapping blocks each of 2 pixels×2 pixels. The actual processing, and its similarity to that required for the 2/10 transform is described below.

In both transforms a two-stage process is used. In the first stage two coefficients L and H are derived from the pixel data in a one-dimensional transform; in the second stage a two-dimensional transform derives the LL, LH, HL, and HH values. In fact the equation for the initial low pass filtering is the same for both transforms. The high-pass filtering is similar, however, for the 2/10 transform there is an additional "predictor" value derived from looking at existing derived low pass values. This has the effect of "smoothing" the resulting image.

In the following equations P is used to represent the original pixel data. The suffixes $r,c$ represent the now and column coordinates respectively, and p indicates a predictor.

Derivation of $L$ for both Haar and 2/10 transforms:

$$L_{r,c} := \text{floor}\left[\frac{P_{(r,2c)} + P_{r,(2c)+1}}{2}\right].$$ Equation 1

Derivation of $H$ in the Haar Transform:

$$H_{r,c} := P_{(r,2c)} - P_{r,2c+1}.$$ Equation 2

Derivation of the predictor pH in the 2/10 transform:

$$pH_{(r,c)} := \text{floor}\left[\frac{3 \cdot L_{(r,c-2)} - 22 \cdot L_{(r,c-1)} + 22 \cdot L_{(r,c+1)} - 3 \cdot L_{(r,c+2)} + 32}{64}\right].$$ Equation 3

Derivation of $H$ in the 2/10 Transform:

$$H_{r,c} := P_{(r,2c)} - P_{r,(2c)+1} + pH_{(r,c)}.$$ Equation 4

Derivation of $LL$ for both Haar and 2/10 transforms:

$$LL_{(r,c)} := \text{floor}\left[\frac{L_{(2r,c)} + L_{(2r+1),c}}{2}\right].$$ Equation 5

Derivation of $LH$ in the Haar Transform:

$$LH_{r,c} := [L_{(2r,c)} - L_{[(2r)+1,c]}].$$ Equation 6

Derivation of the predictor pLH in the 2/10 Transform:

$$pLH_{(r,c)} := \text{floor}\left[\frac{3 \cdot LL_{(r-2,c)} - 22 \cdot LL_{(r-1,c)} + 22 \cdot LL_{(r+1,c)} - 3 \cdot LL_{(r+2,c)} + 32}{64}\right].$$ Equation 7

Derivation of $LH$ in the 2/10 Transform:

$$LH_{r,c} := L_{(2r,c)} - L_{[(2r)+1,c]} + pLH_{(r,c)}.$$ Equation 8

Derivation of $HL$ for both Haar and 2/10 transforms:

$$HL_{(r,c)} := \text{floor}\left[\frac{H_{(2r,c)} + H_{(2r)+1,c}}{2}\right].$$ Equation 9

Derivation of $HH$ in the Haar Transform:

$$HH_{r,c} := [H_{(2r,c)} - H_{[(2r)+1,c]}].$$ Equation 10

Derivation of the predictor pHH in the 2/10 Transform:

$$pHH_{(r,c)} := \text{floor}\left[\frac{3 \cdot HL_{(r-2,c)} - 22 \cdot HL_{(r-1,c)} + 22 \cdot HL_{(r+1,c)} - 3 \cdot HL_{(r+2,c)} + 32}{64}\right].$$ Equation 11

Derivation of $HH$ in the 2/10 Transform:

$$HH_{r,c} := H_{(2r,c)} - H_{[(2r)+1,c]} + pHH_{(r,c)}.$$ Equation 12

Example of the Transform Equations in Action

The operation of the above equations is best understood by example. FIG. 8 shows a pixel array of 10×10 pixels with some arbitrary values for P. The layout is purely for example to draw attention to the workings of the 2/10 and Haar transforms. The 10×10 array is the minimum that can be used to demonstrate the 2/10 and has no other significance.

If Equations 1 and 2 are applied to the array of FIG. 8, the result is as shown in FIG. 9. Here the points to notice are:
(a) the transform process halves the number of columns (the equations are solved for r=0 . . . 9 and c=0 . . . 4);
(b) the overall quantity of image data has, however, remained the same (by virtue of having the two sets of coefficients L and H).

FIG. 9 results represent the first pass "one-dimensional" horizontal transform. When the results of FIG. 9 are applied to Equations 5, 6, 9 and 10, the second "two-dimensional" vertical transform is completed. The overall result is the complete Haar transform and is of the form shown in FIG. 10. Notice how now both row and column data have been halved, but once again the amount of data overall remains the same.

While the Haar transform can be seen to apply to the whole anay, the situation with the 2/10 transform is quite different. The Haar transform operates on 2×2 pixel blocks, but the 2/10 requires data from many more pixels—in fact for the example it can only give valid results for the four center pixels in the array (i.e. the ones shown with values 80, 48, 45, 110 in FIG. 8).

Applying Equations 1, 3, and 4 in the range c=4 . . . 5 and r=2 produces the 2/10 values for L and H; then if Equations 5, 7, 8, 9, 11 and 12 are solved, the 2/10 values for LL, LH, HL and HH are derived.

FIG. 11 shows these solutions for the example. On the left are shown the solutions for L and H, and, on the right, are shown the solutions for LL, LH, HL and HH. Note that the information on the right-hand side of FIG. 11 is the minimum that must be transmitted to ensure that it is possible to recover the original pixel data.

The Reverse Transforms

Both the Haar and the 2/10 transforms are reversible and are suitable for both lossless and lossy compression. However, in using the equations above in the form stated, there is bit growth in the "detail" outputs (there is no bit growth in the LL or "smooth" output). For this reason, in the preferred system, the output transform data is operated on using the principle of "Property of Precision Preservation" already referred to above, and which results in no bit growth while retaining a lossless performance. (The PPP applied in this way is due to Hongyang, Fisher and Zeyi.)

An important point to appreciate with respect to the transform equations is they are all operated in the integer domain, and yet produce lossless results. The insight here is due to Pearlman and also to Gormish et al. from Ricoh.

The equation set for carrying out the wavelet transforms have been provided above. There now follow the corresponding equations to reverse the process and to recover the pixel data.

If the transform results shown in FIGS. 10 and 11 were to be fed into the equations that follow (operated over the appropriate ranges), the pixel data emerging would be exactly as shown in FIG. 8.

Vertical reverse Haar
transform to recover $L$ and $H$:

$$L_{r\cdot2,c} := LL_{r,c} + \mathrm{floor}\left(\frac{LH_{r,c}+1}{2}\right)$$

$$L_{r\cdot2+1,c} := LL_{r,c} - \mathrm{floor}\left(\frac{LH_{r,c}}{2}\right)$$

$$H_{r\cdot2,c} := HL_{r,c} + \mathrm{floor}\left(\frac{HH_{r,c}+1}{2}\right)$$

$$H_{r\cdot2+1,c} := HL_{r,c} - \mathrm{floor}\left(\frac{HH_{r,c}}{2}\right).$$

Equation set 13

Horizontal reverse Haar
transform to recover pixels:

$$P_{r\cdot2,c\cdot2} := L_{r\cdot2,c} + \mathrm{floor}\left(\frac{H_{r\cdot2,c}+1}{2}\right)$$

$$P_{r\cdot2,c\cdot2+1} := L_{r\cdot2,c} - \mathrm{floor}\left(\frac{H_{r\cdot2,c}}{2}\right)$$

$$P_{r\cdot2+1,c\cdot2} := L_{r\cdot2+1,c} + \mathrm{floor}\left(\frac{H_{r\cdot2+1,c}+1}{2}\right)$$

$$P_{r\cdot2+1,c\cdot2+1} := L_{r\cdot2+1,c} - \mathrm{floor}\left(\frac{H_{r\cdot2+1,c}}{2}\right).$$

Equation set 14

Vertical reverse 2/10
transform to recover $L$ and $H$:

$$L_{r,c} := LL_{r,c} + \mathrm{floor}\left(\frac{LH_{r,c} - pLH_{r,c}+1}{2}\right)$$

$$L_{r+1,c} := LL_{r,c} - \mathrm{floor}\left(\frac{LH_{r,c} - pLH_{r,c}}{2}\right)$$

$$H_{r,c} := HL_{r,c} + \mathrm{floor}\left(\frac{HH_{r,c} - pHH_{r,c}+1}{2}\right)$$

$$H_{r+1,c} := HL_{r,c} - \mathrm{floor}\left(\frac{HH_{r,c} - pHH_{r,c}}{2}\right).$$

Equation set 15

Horizontal reverse 2/10
transform to recover pixels:

$$P_{r,c} := L_{r,c} + \mathrm{floor}\left(\frac{H_{r,c} - pH_{2\cdot r,c}+1}{2}\right)$$

$$P_{r,c+1} := L_{r,c} - \mathrm{floor}\left(\frac{H_{r,c} - pH_{2\cdot r,c}}{2}\right)$$

$$P_{r+1,c} := L_{r+1,c} + \mathrm{floor}\left(\frac{H_{r+1,c} - pH_{2\cdot r+1,c}+1}{2}\right)$$

$$P_{r+1,c+1} := L_{r+1,c} - \mathrm{floor}\left(\frac{H_{r+1,c} - pH_{2\cdot r+1,c}}{2}\right).$$

Equation set 16

Operation of the Transform Engine

The essence of the practical realization of the transform engine is breaking the task down into a number of simple steps, each one of which operates in a completely deterministic way. Some of the problems that must be solved are:

(a) dealing with the "out of block" pixel data required by the 2/10 transform (the 32×32 block can be processed on its own in respect of the Haar transform, but the 2/10 requires data from pixels that are from a whole block and a partial block to complete the 32×32 transform);

(b) simplifying the tasks in such a way that the transform engine components do not have to "know" whether they are dealing with vertical or horizontal data—each element should just carry out a simple arithmetical task; and (c) finding a way to reduce the processing time: implicit in the five-level 2D transform process is the need to carry out a succession of operations resulting in a multiple of the time taken to process a single frame's worth of pixel data; clearly it is necessary to ensure that the entire process of transforming and encoding a frame can all be carried out in a time that is less than the original frame time.

Figure 12:
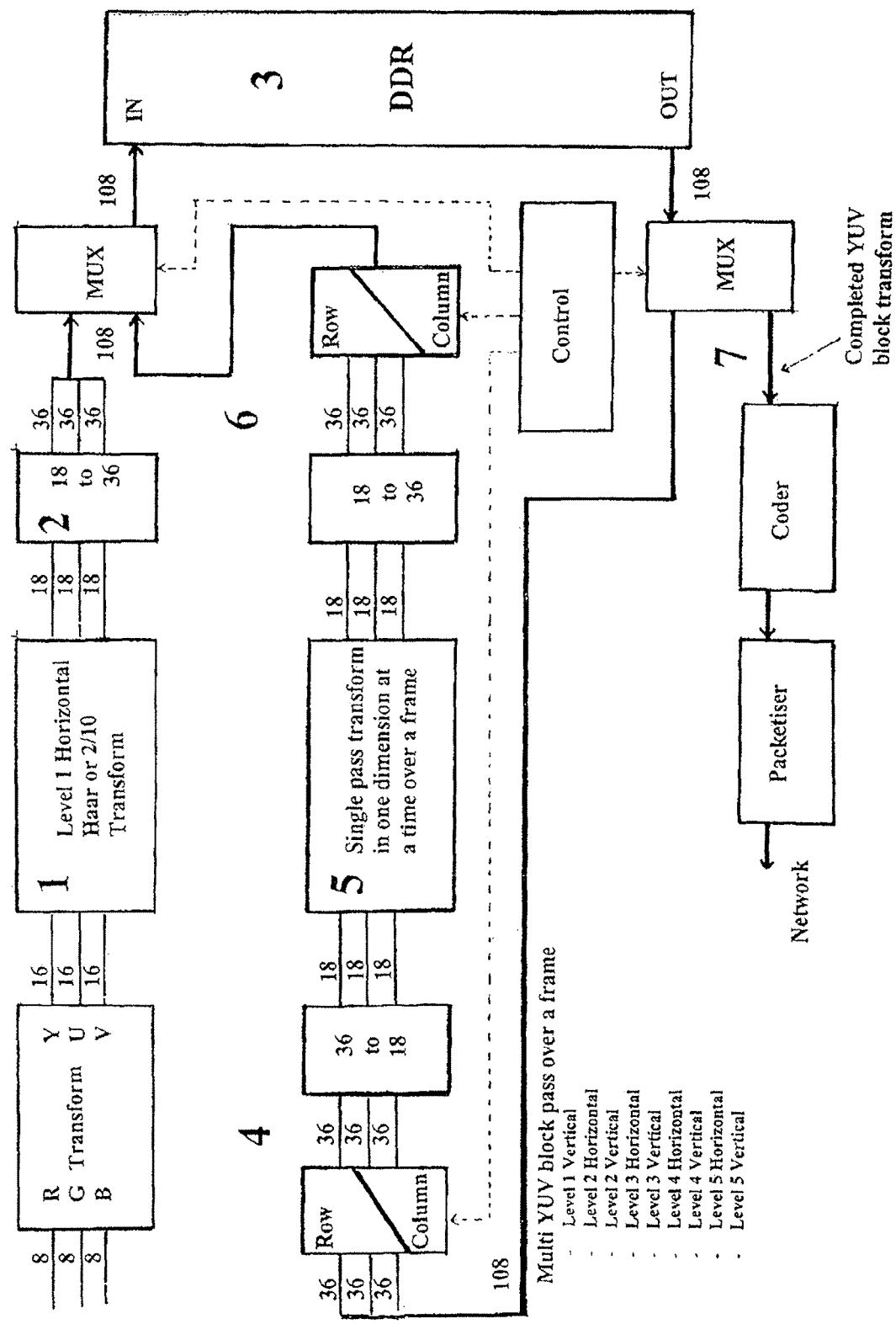
FIG. 12 is a block diagram showing the architecture of the entire encoding system.

FIG. 12 is a block diagram of the entire encode system architecture, although only items 1 to 7 will be described at this stage. The YUV transform process has already been described above. The encoder and the packetiser are described below. The principal processes in the transform engine proper, which actually consists of two transform engines and a large memory, are now described.

Figure 13:
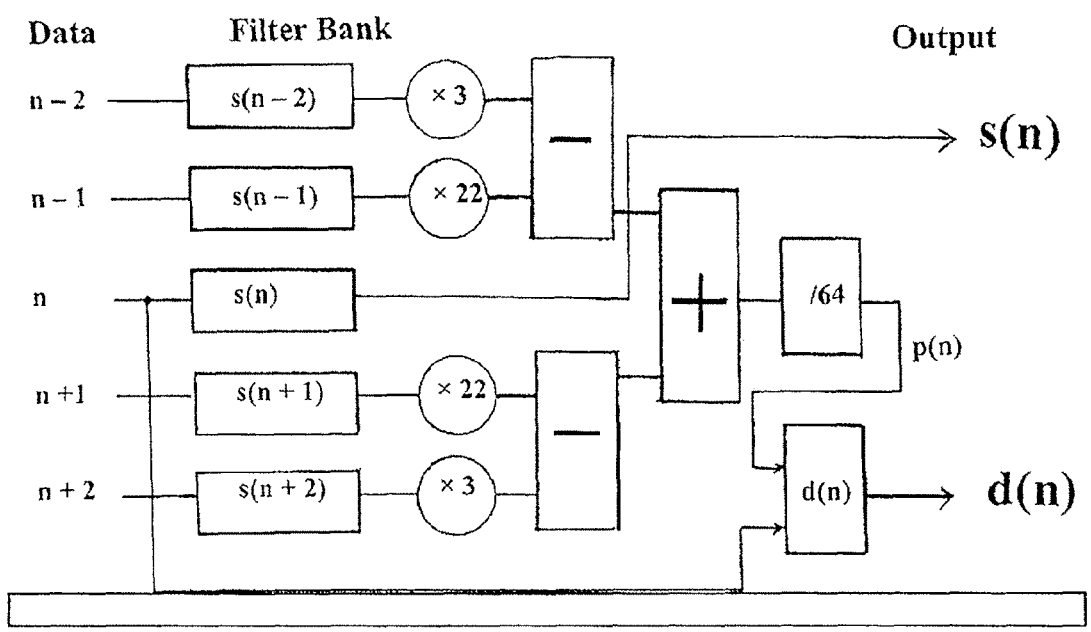
FIG. 13 illustrates the preferred transform engine in detail.

1. Image data enters the transform engine two pixels at a time and the first task is the Level 1 Horizontal transform. This generates the L and H data according to Equation 1, and either Equation 2 or Equation 4. It can be seen that the H equations are the same with the exception of the predictor, so it is possible to use a single set of equations, with p being set to zero for the Haar transform. FIG. 13 shows how the data for a typical pixel n is derived. The filter equations for deriving the values of s(n) and d(n) are shown below.

FIG. 13 shows how the predictor p is derived for the 2/10 transform. The transform engine is not itself interested in co-ordinates, so the equations are expressed in a simplified form showing the s or "smooth" component, and the d or "detail" component. At this stage these correspond to L and H.

$$s(n)=\lfloor(x(2n)+x(2n+1))/2\rfloor$$

$$d(i)=x(2n)-x(2n+1)+p(n)$$

2. FIG. 12 assumes 8-bit color, so the input to the transform engine is shown as 48 bits wide (two pixels are read in at a time). When it emerges it is 54 bits wide because of the addition of a sign. The "18 to 36" box converts the data to 108 bits wide by combining the data of four transform coefficients. This is a stratagem for shortening the time taken to load the memory, and therefore allowing time for the multiple pass access to the memory needed for the succeeding two-dimensional transform.

3. The two transform engines 1, 5 are supported by a large DDR (Double Data Rate) memory 3. The input and output of the memory 3 are equipped with multiplex switches (MUX). The one on the input side selects between data from the output of the two transform engines, and the one on the output sends data either to the second transform engine or to the Coder. The memory 3 is large enough to contain the equivalent of two image frames of data. The transform data from odd-numbered frames in a sequence are stored in a first section of the memory 3, and even-numbered frames are stored in a second section.

4. The data from the output of the first transform is read out of the memory 3 in 32×32 block format. To carry out the succeeding levels of transform requires the data to undergo multiple passes through the second transform engine. In order that the engine itself can be "dumb" and not be concerned as to whether it is processing row or column data, row and column control is provided external to the transform engine. Prior to arriving at the transform engine, the data is re-ordered back to 54-bit wide.

5. The idea of using external row and column control allows the second transform engine (5) to be identical to the first one. It only works in a single dimension itself, but produces the two-dimensional transform by treating the row and column data in sequence. To produce the five-level transform the YUV block data must have multiple passes through the transform engine. The reason that this is possible within the frame time is that the Level 1 transform takes the great majority of the time (about 75%). The succeeding levels, although requiring multiple passes, actually take up much less time because the number of coefficients is much smaller (see FIG. 6). Note that, in order to carry out the 2/10 transform, the recirculated data must include "out of block" coefficients.

Figure 14:
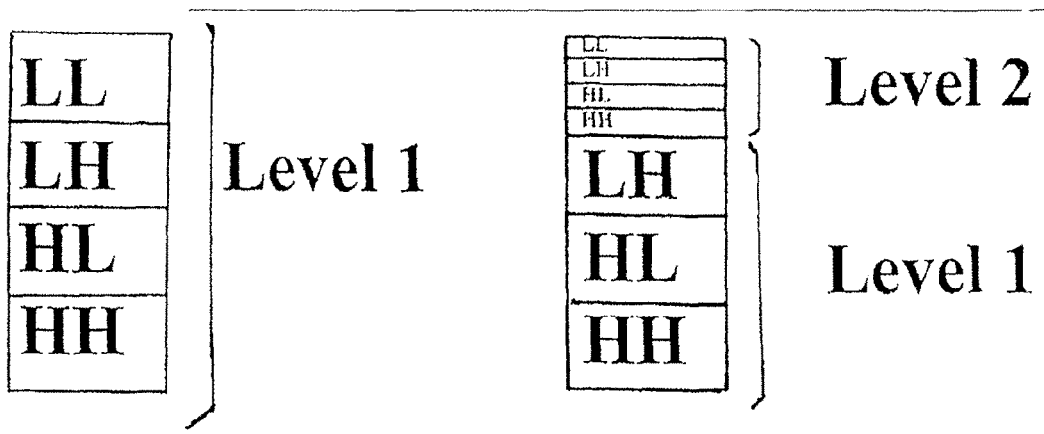
FIG. 14 illustrates successive re-writing in memory.

6. The output of the second transform engine is re-ordered back to 108-bit wide before going back into the memory. FIG. 14 shows the idea of successive re-writing in memory. On the left is the result of the Level 1 transform; when the Level 2 transform is completed, only the LL part of the Level 1 data is over-written with Level 2 data. It is clear from this figure why the amount of re-circulated data reduces as each level of transform is completed. Once the Level 1 two-dimensional transform has been completed the coefficients are stored according to the left of the diagram. The LL coefficients are then overwritten by the new set of coefficients for Level 2. These occupy exactly the same space in memory, as depicted on the right. The process is repeated up to Level 5.

7. The completed YUV block transform data is released by the MUX to the encoder section.

It is important to note: first that confirmation that the original YUV data is essentially lossless with respect to the RGB original, and that ALL this data goes forward to the transform process. This is equivalent to saying that all processing is "4:4:4" in professional video terms, and ensures that there is no color spill at "edges"; and secondly, that, at the transform stage, the idea of saving the 2/10 coefficients between blocks achieves the numerical equivalent of a frame based transform. Thus the end result is an image fidelity that is blockless. However, all transform management and all the subsequent coding is done in the block domain which is the key to efficient and deterministic operation.

Encoding the Resultant Data

As stated above, the initial effect of a transform is not to reduce the amount of data, but only to present it in a form that allows more efficient compression.

Data compression can be effected using standard mathematical methods (that are quite independent of the application), but better results can be obtained when advantage is taken of the nature of the underlying data. Wavelet transform data lends itself well to efficient lossless and lossy compression when the data is organized into a "tree" structure.

The fundamental idea behind the use of "trees" is that neighboring pixels in an image are likely to be similar. In the transform domain this is expressed in a different way. If the magnitudes of the wavelet coefficients in a higher sub-band of a decomposition are insignificant relative to a particular threshold, then it is likely that wavelet coefficients having the same spatial location, but relating to lower sub-bands will also be insignificant. Furthermore when proceeding from the highest to the lowest levels of the wavelet "pyramid" the variations in the wavelet coefficients decrease. This leads to the idea that the coding of a large number of insignificant wavelet coefficients can be done very efficiently.

Known methods include the Spatial Orientation Tree or SOT (Shapiro) and the Set Partitioning in Hierarchical Trees SPIHT (Pearlman). The problem with both of these methods is that they require the data to be visited more than once. The preferred method also uses the tree principle, in the form of a "Quadtree", but does so in a way that requires the data to be visited only once. This allows the production of a real time single-pass compression engine that carries out its task in a precisely defined cycle.

The aim of the system is to code two different types of information; one is the "control" or coding information, and the other is the "data". The coding information is sent ahead of the data, so the decoding system knows in advance how to treat the data that follows. The basic coding system is lossless; but lends itself very well to precisely defined levels of lossy compression.

The LKCS Encoding

Data relating to an individual image is partitioned into blocks of 32×32 wavelet coefficients. This block data is then separated into nine planes, eight data planes and one sign plane. Each plane is then rearranged as 64 rows of 16 bits, as shown in FIG. 19 and described in more detail below.

Figure 15:
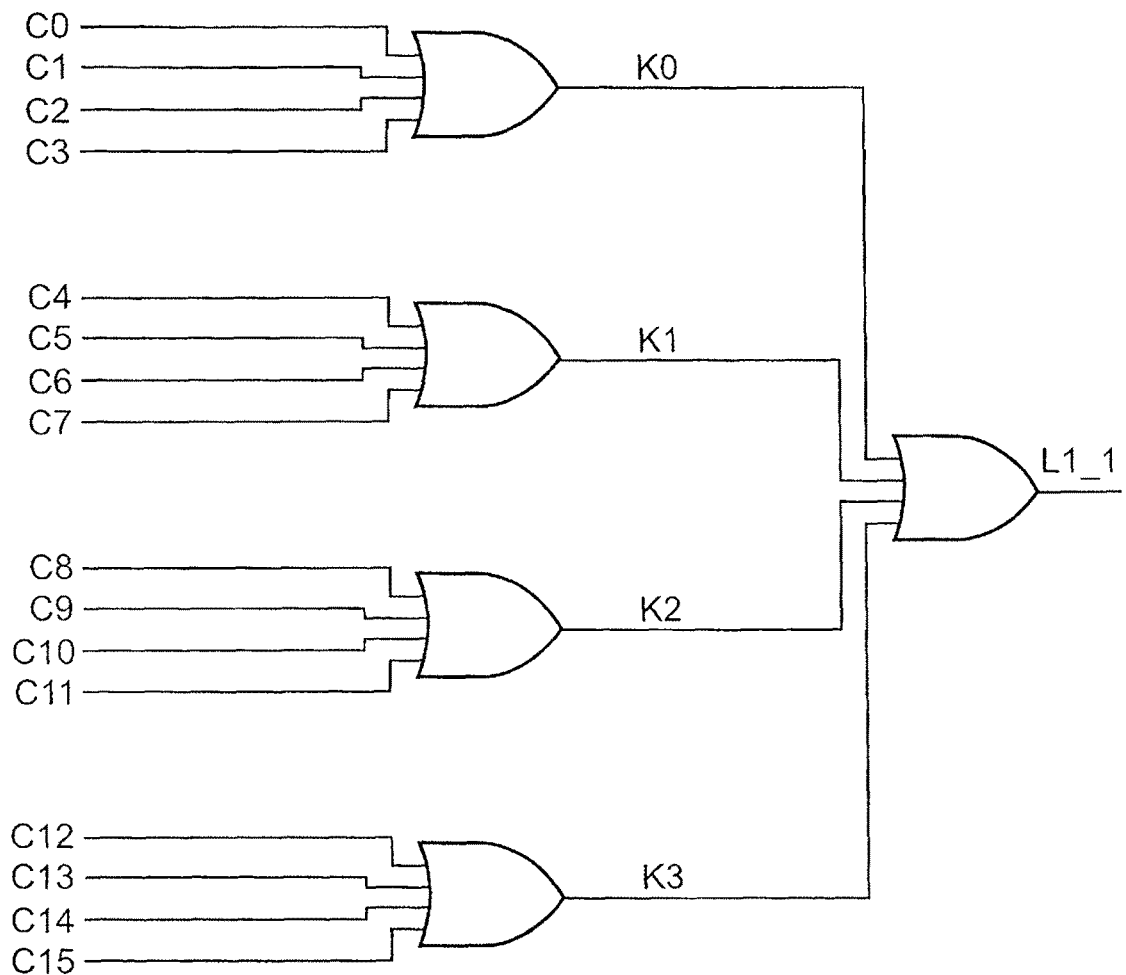
FIG. 15 illustrates the CKL-tree showing how the coefficient data are analyzed.

FIG. 15 shows how one such row is encoded into a "CKL-Tree". For simplicity, the data bits of the 16 coefficients are shown in a line, but it must be remembered they actually refer to a two-dimensional array. These 16 coefficients are divided into four sets, each set connected to a "K-type" tree. If all the coefficients in a set are zero, then the corresponding K-type is also zero, and it is only necessary to retain the K-type. If the set is not zero, then it is necessary to retain the original coefficient data and the K-type. (In Boolean terms the K tree is an OR gate with four inputs. If output is 0, then only the information K=0 is retained. If output is 1, then both the information K=1 and the four individual data bits must be retained.)

The four K-types also form a set and follow the same probability laws, so it is possible to repeat the tree idea. The K-type set forms a tree to an L-type. Thus if a K-type set is zero only the L-type needs to be retained.

The next step is to encode the L-type trees within the individual bit plane. Each L-type represents a row within a 64 row block, and this fits perfectly into an L tree structure of 64 L-types. FIG. 16 shows how this happens and also shows how the L-types relate to the original transform data (HL, LH and HH). The figure show 20 L-types for HL at Levels 1 and 2 and the four final L-types at Levels 3, 4 and 5. There are also 20 L-types for each of LH and HH at Levels 1 and 2 as indicated in the diagram.

The L-tree again capitalises on the likelihood of similarity. Encoding is performed from the bottom of the tree (Level 1) up to Level 4/5. In hierarchical terms, Level 4/5 can be considered the "parent", and Levels 3, 2 and 1 have a "child" relationship to it. The encoding procedure is the same as before.

The exact operation of the encoding "node" is shown in FIG. 16. The process can be illustrated by considering the node marked L2__0. Here the Boolean operation is of a five-input OR gate, with four of the inputs being the L1__0 through L1__3 data, and the fifth input being the L2__0 data. As before, if the output of the gate is 1, then both the L-type and the preceding data must be retained, but if it is 0, then only the L-type is retained. The process is then repeated at the Level 3 nodes and thence to Level 4/5.

It can be seen that very large coding gains are achieved when there are large areas with zero coefficients—in the extreme case if all the coefficients in a bit plane are zero, only level 4/5 is retained.

Now it can be seen that, while the coding process can result in a considerable reduction in the data, there an overhead where L and K values have to be retained. The L and K bits themselves are additional to the original data, i.e. while the tree process is reducing original data, it can also be adding control data. Some of the coding gain is being lost, and it is desirable to minimize this loss. This can be done by taking an overview of all eight data planes. FIG. 17 shows the idea of the planes with Plane 7 being the most significant and Plane 0 the least significant. By virtue of the wavelet transform Plane 7 contains the most zeros, and therefore on this plane the K and L structure will be at its most efficient in terms of coding gain as most of the coefficients will be zero.

A way of looking at K- and L-types is that they provide a record of the significance of coefficients in a plane. This record can be passed from one plane to another, and can be used to determine when a corresponding K- or L-type became significant (i.e. became=1). Once this has been detected it is no longer necessary to store the type for succeeding planes (since the data is being retained anyway). This procedure eliminates redundant L-types and K-types.

The process of scanning the successive planes is also used to code the sign plane (Plane 8). In the transform process the 8-bit pixel data becomes 9-bit, indicating a range of ±255. In the sign plane the 1024 coefficients are designated positive by 0, and negative by 1. The sign data is coded on the basis of significance, so when the significance scan is done (for eliminating redundant K and L types) only those coefficients that are significant have their sign data encoded (since clearly it would be redundant to code sign data to zero coefficients that have already been discarded).

The whole encoding process can now be summarized as the generation of LKCS data, where each plane is coded in a sequence of four sections, and where:

L=L-type tree
K=K-type tree
C=Coefficient Data
S=Sign

For lossless encoding it is necessary to plan the encoded data for the "worst case", i.e. the case where the original image is so complex that there is actually no coding gain. The process is, therefore, as follows:

(a) The L-tree is coded with up to 64 bit data, corresponding to the L-types. While these are themselves derived from knowledge of K-types, this section must be first in the bit stream. This is because the decoder needs to know ahead of time which rows are being sent and which rows are not sent (insignificant). The L-type bits, together with the compression profile (see below) allow the decoder to reconstruct the L-type tree.

(b) K-types are coded next with up to 256 bit data corresponding to the 256 K-types. The decoder uses the reconstructed L tree to decode the map of the K-types.

(c) The original coefficient data C is coded next with up to 1024 bits. The decoder uses the reconstructed L- and K-types to decode the map of the C data.

(d) The sign data S are coded last with up to 1024 bit data. The decoder uses the reconstructed C data to decode the map of the S data.

The whole LKCS process is repeated for each of the 8 image planes.

Encoding for Spatial Compression

Clearly once the process described above has been completed there is a situation where the actual encoded data is of variable length. While it is statistically improbable (even impossible) that there would ever be a situation where there was a coding loss (i.e. the coding process actually resulted in an increase in the data) it is the case that the lossless coding results in a variable outcome which would be difficult to manage in the intended real time applications.

In order to achieve a more predictable outcome, in terms of bit rate, and to introduce lossy compression with high coding gains, the LKCS data is subject to a compression profile. In principle this is no more than removing data based on resolution and bit-plane number. This profile is sent as a header to the bit stream, so that the decoder knows in advance what has been deleted.

The trend of successive profiles is to apply the most aggressive deletion to Plane 0 and Level 1, and to progressively reduce the deletion with rising levels and planes. In practice the compression profile is applied at the time of coding the CKL and L trees, meaning that both the unwanted coefficient data and the corresponding K- and L-types are deleted. This is important since it results in both the original data and the control information being compressed—otherwise there would be a situation where at high compression levels the control information would become dominant.

Compression Profile

The compression profile uses a weighting method that exploits the visual perception characteristics of the human eye. In principle the human eye is less sensitive to the loss of high frequencies, so any compression scheme starts by eliminating the high-frequency components and by ensuring that the effect of quantization noise is also eliminated.

The weighting scheme is aligned to the sub-band levels of the wavelet transform, and the idea is shown in FIG. 18 (which should be compared with FIG. 6). Another way of putting it is that the compression is applied to the L-tree, not to the original data.

In FIG. 18 an easy (and typical) example is to take "a" as a=2. Then it can be seen that HH at any level has twice the compression (half the data) of the corresponding LH and HL; further that progressively less compression is applied at the higher levels where the more significant information resides.

The preferred weighting method is to vary the value of "a" to obtain a range of compression ratios. FIG. 18 is conceptual, in that it conveys the relative notional weights applied; but in practice the range of compression is in the form of a set of individual profiles that are applied at the encoder. The user can select one of the given profiles or even define a custom profile.

In defining a profile the aim is to ensure that the re-constructed image has minimum errors, and at the same time has the highest perceptual quality (i.e. the image is perceived by the viewer as "natural"). This necessarily results in some compromise, and in practice perceptual quality is more important at lower bit rates.

The weighting scheme is simple, efficient and independent of the actual image. It is effected by a 16-bit Profile parameter that relates directly to one bit-plane of an L-type tree. This is shown in Table 1; if a bit is equal to 0, the data is removed, if the bit is equal to 1, the data is retained. The process can be described as "pruning the L-tree" and is achieved by a logical AND operation with the L-type bit or bits.

For example if Bit 10=0, then all four bits of L_LH2 would be zeroed, but if Bit 10=1, then only those bits of L_LH2 with value 1 would be retained.

The presence of "spare bits" needs explaining. In the original structure space was allowed for the individual components of L_4/5. In practice this is redundant for all normal images, but the facility has been retained in case later developments (possibly involving very large images) require these extra bits. The chip design retains the facility for using them, but the scheme does not result in the redundant data being sent.

The control of the L-type tree provides very efficient compression, since when more zeroes are formed, both data and control are removed by the profile parameter.

Examples of Profiles

Table 2 and Table 3 show examples of compression profiles. Table 2 is an actual example of a compression profile that provides a visually lossless image. By studying the bits set to 1 or 0 it is possible to get an idea of the weighting of the profile, and it is immediately clear that significant planes and levels have no compression applied. Such a profile can give a spatial compression ratio in the range 20:1 to 30:1.

Table 3 shows an example of heavy compression, in the range 50:1 to 100:1, and it is obvious that much more of the data has been discarded. Notice that L_4/5 data is retained for all planes, since any loss of this data would have a serious effect on image quality, while only providing a marginal reduction in bit rate.

When defining a profile it is important that the removal of data is done in a way that ensures all data relating to a particular resolution level is removed within a bit plane, since otherwise the resulting image would have a non-uniform spatial quality. The eye is sensitive to this potential artifact: for example when viewing a human face the eye expects a uniform quality, but is troubled if different parts of the face have different qualities.

The Encoding Engine

The description of the encoding process so far given has described a number of discrete processes. In FIGS. 12 and 13 the concept of a "transform engine" to carry out the wavelet transform was shown in some detail; but in FIG. 12 the coding process was simply shown as a function within the block diagram, without any detail as to how the encoder worked.

Re-Arranging the Transform Data

The result of the transform process is image coefficient data in 32×32 blocks (there are three sets of such blocks, Y, U and V) and within the blocks the coefficient data is ordered, starting with the Level 5 data, and ending with the Level 1 data.

For each bit plane the data is first re-arranged to 64 rows each of 16 bits, since this facilitates the derivation of the L tree. The organisation and its relationship to the coefficient data is clearly seen in the following diagram.

The L-Encoder

As mentioned above, the L-tree is derived first, since this is both needed first in the decode process, and results in the discarding of the largest amount of coefficient data. The task of the "L-tree coding engine" is quite complex, since it must work in three dimensions:

(a) a logical AND operation must be carried out on the data to impose the desired compression profile;
(b) deriving an L-type is itself quite simple because this is a logical OR operation on a single row of data, working from Row 63 to Row 0;
(c) but it is redundant to designate an L-type if it is already known that coefficient data is significant, so the process must work downwards from the most significant plane;
(d) the desired end result is the discarding of all insignificant coefficient data, the retention of the remaining coefficient data; and a compact description of the location of all L-types; and
(e) the engine must work on a single pass basis in that it must not be required to "re-visit" data.

FIG. 20 shows the process in block diagram form. L FORMAT builds the 64 Ls from the 64×16 coefficient bits in one plane.

The L TREE produces eight planes of: L_CUR[63..0], L_MSK[63..0] and L_SIG [3.0] working from the most significant Plane 7 to the least significant Plane 0. Note how the compression profile is applied at this stage. These items represent the "output" of the L encoder. Here:

L_CUR[63.0] is the L tree state of the current plane;
L_MSK[63.0] is the mask determining which L_CUR bits are not sent; and
L_SIG [3.0] is L SIGNIFICANCE and is used by the K, C and S passes; it indicates which rows are not sent.

L ACC produces L_ACC[63 . . . 0] which is a record of the current ORed state of all previous planes.

The equations used in the L encoder are as follows:

| Definitions of L_CUR and L_SIG | Compression Profile |
|---|---|
| L_cur[0] = L4/5 | C_prof[15 . . . 0] |
| L_cur[1] = L3_LH | LL5 = [0] |
| L_cur[2] = L3_HL | LH5 = [1] |
| L_cur[3] = L3_HH | HL5 = [2] |
| L_cur[7 . . . 4] = L2_LH[3 . . . 0] | HH5 = [3] |
| L_cur[11 . . . 8] = L2_HL[3 . . . 0] | LH4 = [4] |
| L_cur[15 . . . 12] = L2_HH[3 . . . 0] | HL5 = [5] |

| Definitions of L_CUR and L_SIG | Compression Profile |
|---|---|
| L_cur[31...16] = L1_LH[15...0] | HH5 = [6] |
| L_cur[47...32] = L1_HL[15...0] | LH3 = [7] |
| L_cur[63...48] = L1_HH[15...0] | HL3 = [8] |
| L_sig[3...0], | HH3 = [9] |
| is the L significance for one 64-way row | LH2 = [10] |
| (total = 64 * 16) | HL2 = [11] |
| | HH2 = [12] |
| | LH1 = [13] |
| | HL1 = [14] |
| | HH1 = [15] |

Logic equations for calculating L_CUR[63...0] the UP Ltree.

| Equations | Comment |
|---|---|
| L_cur[0] = (L[0] # L_cur[3] # L_cur[2] # L_cur[1]) & C_prof[0]; | (L4/5 L[0] or child) |
| L_cur[1] = (L[1] # L_cur[7] # L_cur[6] # L_cur[5] # L_cur[4]) & C_prof[7]; | (L3_LH) |
| L_cur[2] = (L[2] # L_cur[11] # L_cur[10] # L_cur[9] # L_cur[8]) & C_prof[8]; | (L3_HL) |
| L_cur[3] = (L[3] # L_cur[15] # L_cur[14] # L_cur[13] # L_cur[12]) & C_prof[9]; | (L3_HH) |
| L_cur[4] = (L[4] # L_cur[19] # L_cur[18] # L_cur[17] # L_cur[16]) & C_prof[10]; | (L2_LH[0]) |
| L_cur[5] = (L[5] # L_cur[23] # L_cur[22] # L_cur[21] # L_cur[20]) & C_prof[10]; | (L2_LH[1]) |
| L_cur[6] = (L[6] # L_cur[27] # L_cur[26] # L_cur[25] # L_cur[24]) & C_prof[10]; | (L2_LH[2]) |
| L_cur[7] = (L[7] # L_cur[31] # L_cur[30] # L_cur[29] # L_cur[28]) & C_prof[10]; | (L2_LH[3]) |
| L_cur[8] = (L[8] # L_cur[35] # L_cur[34] # L_cur[33] # L_cur[32]) & C_prof[11]; | (L2_HL[0]) |
| L_cur[9] = (L[9] # L_cur[39] # L_cur[38] # L_cur[37] # L_cur[36]) & C_prof[11]; | (L2_HL[1]) |
| L_cur[10] = (L[10] # L_cur[43] # L_cur[42] # L_cur[41] # L_cur[40]) & C_prof[11]; | (L2_HL[2]) |
| L_cur[11] = (L[11] # L_cur[47] # L_cur[46] # L_cur[45] # L_cur[44]) & C_prof[11]; | (L2_HL[3]) |
| L_cur[12] = (L[12] # L_cur[51] # L_cur[50] # L_cur[49] # L_cur[48]) & C_prof[12]; | (L2_HH[0]) |
| L_cur[13] = (L[13] # L_cur[55] # L_cur[54] # L_cur[53] # L_cur[52]) & C_prof[12]; | (L2_HH[1]) |
| L_cur[14] = (L[14] # L_cur[59] # L_cur[58] # L_cur[57] # L_cur[56]) & C_prof[12]; | (L2_HH[2]) |
| L_cur[15] = (L[15] # L_cur[63] # L_cur[62] # L_cur[61] # L_cur[60]) & C_prof[12]; | (L2_HH[3]) |
| L_cur[19...16] = L[19...16] & C_prof[13]; | (L1_LH[3...0]) |
| L_cur[23...20] = L[23...20] & C_prof[13]; | (L1_LH[7...4]) |
| L_cur[27...24] = L[27...24] & C_prof[13]; | (L1_LH[11...8]) |
| L_cur[31...28] = L[31...28] & C_prof[13]; | (L1_LH[15...12]) |
| L_cur[35...32] = L[35...32] & C_prof[14]; | (L1_HL[3...0]) |
| L_cur[39...36] = L[39...36] & C_prof[14]; | (L1_HL[7...4]) |
| L_cur[43...40] = L[43...40] & C_prof[14]; | (L1_HL[11...8]) |
| L_cur[47...44] = L[47...44] & C_prof[14]; | (L1_HL[15...12]) |
| L_cur[51...48] = L[51...48] & C_prof[15]; | (L1_HH[3...0]) |
| L_cur[55...52] = L[55...52] & C_prof[15]; | (L1_HH[7...4]) |
| L_cur[59...56] = L[59...56] & C_prof[15]; | (L1_HH[11...8]) |
| L_cur[63...60] = L[63...60] & C_prof[15]; | (L1_HH[15...12]) |
| L_cur[63...0] = L_cur_[63...0] & !L_acc[63...0]; | L_cur[n] can only be significant for 1 plane (transition to significance); note that that L coding stops beyond the point of becoming significant. |

Logic equations for calculating L_SIG

| | |
|---|---|
| L4_sig = (L_cur[0] # L_acc[0]) & C_prof[0]; | L_SIG is used by K, C and S passes and indicates which rows are not sent. A row is not sent when an Ln_XX_sig = 0. Lsig[3...0] maps to 4 rows i.e. there is a sequence of 16 sets for processing the 16 cycle K, C and S passes where sel[0] to sel[15] selects the sequence. |
| L3_LH_sig = (L_cur[1] # L_acc[1]) & C_prof[7]; | |
| L3_HL_sig = (L_cur[2] # L_acc[2]) & C_prof[8]; | |
| L3_HH_sig = (L_cur[3] # L_acc[3]) & C_prof[9]; | |
| L2_LH_sig[3...0] = (L_cur[7...4] # L_acc[7...4]) & C_prof[10]; | |
| L2_HL_sig[3...0] = (L_cur[11...8] # L_acc[11...8]) & C_prof[11]; | |
| L2_HH_sig[3...0] = (L_cur[15...12] # L_acc[15...12]) & C_prof[12]; | |
| L1_LH_sig[15...0] = (L_cur[31...16] # L_acc[31...16]) & C_prof[13]; | |
| L1_HL_sig[15...0] = (L_cur[47...32] # L_acc[47...32]) & C_prof[14]; | |
| L1_HH_sig[15...0] = (L_cur[63...48] # L_acc[63...48]) & C_prof[15]; | |
| L_sig[3...0] = ((L3_HH_sig,L3_HL_sig,L3_LH_sig,L4_sig) & sel[0]) # | L_sig[3...0] passes 4 significance values to each (4 * 16) K,C,S word. There are 3 passes of 16 for each type (K,C,S) |
| (L2_LH_sig[3...0] & sel[1]) # | |
| (L2_HL_sig[3...0] & sel[2]) # | |
| (L2_HH_sig[3...0] & sel[3]) # | |
| (L1_LH_sig[3...0] & sel[4]) # | |
| (L1_LH_sig[7...4] & sel[5]) # | |
| (L1_LH_sig[11...8] & sel[6]) # | |
| (L1_LH_sig[15...12] & sel[7]) # | |
| (L1_HL_sig[3...0] & sel[8]) # | |
| (L1_HL_sig[7...4] & sel[9]) # | |
| (L1_HL_sig[11...8] & sel[10]) # | |
| (L1_HL_sig[15...12] & sel[11]) # | |
| (L1_HH_sig[3...0] & sel[12]) # | |
| (L1_HH_sig[7...4] & sel[13]) # | |

| Logic equations for calculating L_SIG |
| --- |
| (L1_HH_sig[11 . . . 8] & sel[14]) # |
| (L1_HH_sig[15 . . . 12]& sel[15]). |

| Logic equations for calculating L_MSK | Comment |
| --- | --- |
| | This is used to decide which L bits of L_cur[63 . . . 0] are not sent. An L-bit is not sent when its parent is 0 or its C_prof[ ] is 0. It incorporates a down L-tree (top to bottom). Each pass is a plane and done from most significant to least significant (plane 7 to 0) |
| L_msk[0] = !L_acc[0] & C_prof[0]; | (L4/5) |
| L_msk[1] = !L_acc[1] & C_prof[7] & (L_cur[0] # L_acc[0]); | (L3_LH ( ) = parent |
| L_msk[2] = !L_acc[2] & C_prof[8] & (L_cur[0] # L_acc[0]); | (L3_HL) |
| L_msk[3] = !L_acc[3] & C_prof[9] & (L_cur[0] # L_acc[0]): | (L3_HH) |
| L_msk[7 . . . 4] = !L_acc[7 . . . 4] & C_prof[10] & (L_cur[1]# L_acc[1]); | (L2_LH) |
| L_msk[11 . . . 8] = !L_acc[11 . . . 8] & C_prof[11] & (L_cur[2]# L_acc[2]); | (L2_HL) |
| L_msk[15 . . . 12] = !L_acc[15 . . . 12]& C_prof[12] & (L_cur[3]# L_acc[3]); | (L2_HH) |
| L_msk[19 . . . 16] = !L_acc[19 . . . 16] & C_prof[13]& (L_cur[4]# L_acc[4]); | (L1_LH[3 . . . 0]) |
| L_msk[23 . . . 20] = !L_acc[23 . . . 20] & C_prof[13]& (L_cur[5]# L_acc[5]); | (L1_LH[7 . . . 4]) |
| L_msk[27 . . . 24] = !L_acc[27 . . . 24] & C_prof[13]& (L_cur[6]# L_acc[6]); | (L1_LH[11 . . . 8]) |
| L_msk[31 . . . 28] = !L_acc[31 . . . 28] & C_prof[13]& (L_cur[7]# L_acc[7]); | (L1_LH[15 . . . 12]) |
| L_msk[35 . . . 32] = !L_acc[35 . . . 32] & C_prof[14]& (L_cur[8]# L_acc[8]); | (L1_HL[3 . . . 0]) |
| L_msk[39 . . . 36] = !L_acc[39 . . . 36] & C_prof[14]& (L_cur[9]# L_acc[9]); | (L1_HL[7 . . . 4]) |
| L_msk[43 . . . 40] = !L_acc[43 . . . 40] & C_prof[14]& (L_cur[10]# L_acc[10]); | (L1_HL[11 . . . 8]) |
| L_msk[47 . . . 44] = !L_acc[47 . . . 44] & C_prof[14]& (L_cur[11]# L_acc[11]); | (L1_HL[15 . . . 12]) |
| L_msk[51 . . . 48] = !L_acc[51 . . . 48] & C_prof[15]& (L_cur[12]# L_acc[12]); | (L1_HH[3 . . . 0]) |
| L_msk[55 . . . 52] = !L_acc[55 . . . 52] & C_prof[15]& (L_cur[13]# L_acc[13]); | (L1_HH[7 . . . 4]) |
| L_msk[59 . . . 56] = !L_acc[59 . . . 56] & C_prof[15]& (L_cur[14]# L_acc[14]); | (L1_HH[11 . . . 8]) |
| L_msk[63 . . . 60] = !L_acc[63 . . . 60] & C_prof[15]& (L_cur[15]# L_acc[15]); | (L1_HH[15 . . . 12]) |

The CS Encoder

FIG. 21 shows the CS Encoder. Within this:

CS FORMAT converts the original 16 bit row format [15..0] to a ×4 row format, i.e. [63..0]. This is done to conform the data to 64 bits, so the final part of the encoding engine can work only on a 64 bit basis.

The sign data is replicated in parallel for all coefficient planes. This is necessary for the next stage which requires the sign to be available for every C plane.

C ACC records the point at which each coefficient becomes significant, and is used by the next stage to determine when a sign should be encoded.

The LKCS Pass

FIG. 22 shows the whole encoding engine. Here L ENCODE and CS ENCODE are the processes already described above.

MX LDPS is the encoding engine. The desired output consists of MX_CUR[63.0] and MX_MSK[63.0]. The other "outputs" shown in FIG. 22 are intermediate data used in calculating the output and appear in the equations shown below.

The real time encoding engine works on a 64 cycle basis, so it is important to be sure that the theoretical worst case of each of L, K, C and S being at maximum values will actually "fit". This is tested by understanding that:

L_PASS=1×L_CUR [63..0] per plane
K_PASS=16×K_CUR[15..0] per plane
C_PASS=16×C_CUR[63..0] per plane
S_PASS=16×S_CUR[63..0] per plane Therefore to generate MX_CUR and MX_MSK requires the full sequence of L, K, C and S passes, that is:

1+16+16+16=49 cycles per plane which is well within the 64 cycle capacity.

The output MX_MSK[63.0] is a mask for selecting which bits of each of L, K, C and S_CUR[ ] are encoded.

The equations used in the LKCS pass now follow:

Deriving K Accumulate from C Accumulate

| |
| --- |
| K_acc[0] = C_acc[0] # C_acc[1] # C_acc[2] # C_acc[3]; |
| K_acc[1] = C_acc[4] # C_acc[5] # C_acc[6] # C_acc[7]; |
| K_acc[2] = C_acc[8] # C_acc[9] # C_acc[10] # C_acc[11]; |
| K_acc[3] = C_acc[12] # C_acc[13] # C_acc[14] # C_acc[15]; |
| K_acc[4] = Cacc[16] # Cacc[17] # C_acc[18] # C_acc[19]; |
| K_acc[5] = C_acc[20] # Cacc[21] # Cacc[22] # C_acc[23]; |
| K_acc[6] = Cacc[24] # Cacc[25] # Cacc[26] # C_acc[27]; |
| K_acc[7] = Cacc[28] # Cacc[29] # Cacc[30] # C_acc[31]; |
| K_acc[8] = C_acc[32] # C_acc[33] # C_acc[34] # C_acc[35]; |
| K_acc[9] = C_acc[36] # C_acc[37] # C_acc[38] # C_acc[39]; |
| K_acc[10]= C_acc[40] # C_acc[41] # C_acc[42] # C_acc[43]; |
| K_acc[11]= C_acc[44] # C_acc[45] # C_acc[46] # C_acc[47]; |
| K_acc[12] = C_acc[48] # C_acc[49] # C_acc[50] # C_acc[51]; |
| K_acc[13] = C_acc[52] # C_acc[53] # C_acc[54] # C_acc[55]; |
| K_acc[14] = C_acc[56] # C_acc[57] # C_acc[58] # C_acc[59]; |
| K_acc[15] = C_acc[60] # C_acc[61] # C_acc[62] # C_acc[63]; |

Deriving the K Type from C_cur

| |
| --- |
| K[0] = C_cur[0] # C_cur[1] # C_cur[2] # C_cur[3]; |
| K[1] = C_cur[4] # C_cur[5] # C_cur[6] # C_cur[7]; |
| K[2] = C_cur[8] # C_cur[9] # C_cur[10] # C_cur[11]; |
| K[3] = C_cur[12] # C_cur[13] # C_cur[14] # C_cur[15]; |
| K[4] = C_cur[16] # C_cur[17] # C_cur[18] # C_cur[19]; |
| K[5] = C_cur[20] # C_cur[21] # C_cur[22] # C_cur[23]; |
| K[6] = C_cur[24] # C_cur[25] # C_cur[26] # C_cur[27]; |
| K[7] = C_cur[28] # C_cur[29] # C_cur[30] # C_cur[31]; |
| K[8] = C_cur[32] # C_cur[33] # C_cur[34] # C_cur[35]; |
| K[9] = C_cur[36] # C_cur[37] # C_cur[38] # C_cur[39]; |
| K[10]= C_cur[40] # C_cur[41] # C_cur[42] # C_cur[43]; |
| K[11]= C_cur[44] # C_cur[45] # C_cur[46] # C_cur[47]; |
| K[12] = C_cur[48] # C_cur[49] # C_cur[50] # C_cur[51]; |

-continued

```
K[13] = C_cur[52] # C_cur[53] # C_cur[54] # C_cur[55];
K[14] = C_cur[56] # C_cur[57] # C_cur[58] # C_cur[59];
K[15] = C_cur[60] # C_cur[61] # C_cur[62] # C_cur[63];
```

The K Pass

Derive K_cur (Needed for Both K_Pass and C_Pass)

```
K_cur[15..0] =   K[15..0] & (!K_acc[15..12] & L_sig[3],
                 !K_acc[11..8] & L_sig[2],
                 !K_acc[7..4] & L_sig[1],
                 !K_acc[3..0] & L_sig[0]) & (K_pass_ # C_pass_);
K_cur[15..0] =   K_cur[15..0] & K_pass_;
```

Make K_Pass Mask

```
K_msk[15..0] =   (!K_acc[15..12] & L_sig[3],
                 !K_acc[11..8] & L_sig[2],
                 !K_acc[7..4] & L_sig[1],
                 !K_acc[3..0] & L_sig[0]) & K_pass_;
```

The C Pass

Derive C_Cur

```
C_cur[63..0] =   (C_cur[63..48] & L_sig[3],
                 C_cur[47..32] & L_sig[2],
                 C_cur[31..16] & L_sig[1],
                 C_cur[15..0] & L_sig[0]) & P_pass_;
```

Prepare and Make C_Pass Mask

```
a[15..0]     =   ( K_cur[15..0] #(K_acc[15..12] & L_sig[3],
                 K_acc[11..8]& L_sig[2],
                 K_acc[7..4] & L_sig[1],
                 K_acc[3..0] & L_sig[0]) ) & C_pass_;
C_msk[63..0] =   (a[15],a[15],a[15],a[15],
                 a[14],a[14],a[14],a[14],
                 a[13],a[13],a[13],a[13],
                 a[12],a[12],a[12],a[12],
                 a[11],a[11],a[11],a[11],
                 a[10],a[10],a[10],a[10],
                 a[9],a[9],a[9],a[9],
                 a[8],a[8],a[8],a[8],
                 a[7],a[7],a[7],a[7],
                 a[6],a[6],a[6],a[6],
                 a[5],a[5],a[5],a[5],
                 a[4],a[4],a[4],a[4],
                 a[3],a[3],a[3],a[3],
                 a[2],a[2],a[2],a[2],
                 a[1],a[1],a[1],a[1],
                 a[0],a[0],a[0],a[0]).
```

The S Pass

```
S_msk[63..0] =   C_cur[63..0] & (!C_acc[63..48] & L_sig[3],
                 !C_acc[47..32] & L_sig[2],
                 !C_acc[31..16] & L_sig[1],
                 !C_acc[15..0] & L_sig[0]) & S_pass_;
S_cur[63..0] =   S[63..0] & S_msk[63..0].
```

The MX LKCS

```
MX_cur[63..0] =  (L_cur[63..0] & L_pass) #
                 ((z[63..16],K_cur[15..0]) & K_pass) #
                 (C_cur[63..0] & C_pass) #
                 (S_cur[63..0] & S_pass);
MX_msk[63..0] =  (L_msk[63..0] & L_pass) #
                 ((z[63..16],K_msk[15..0]) & K_pass) #
                 (C_msk[63..0] & C_pass) #
                 (S_msk[63..0] & S_pass).
```

The Decoding Engine

The decoding engine is based on a set of deterministic principles that provides a "one pass" decoding solution by mirroring the encoding format. The format provides for a progressive calculation that allows for a set of pointers for subsequent data to be known ahead of time. In a pipelined logic structure that contains a dependent feedback element; it is a requirement to know ahead of time the location of future data otherwise the delay (pipeline) will result in a non-real-time decoder.

Like the encoder, the decoder operates on a 64-bit by 64-cycle basis per plane. It decodes the embedded control and data progressively in the same order as it was encoded i.e. LKCS.

The L Decoder

The decoding of the L control bits [63.0] is done in two passes:

L pass 1=Level 4,3,2=L[15..0]
L pass 2=Level 1=L[63..16]

L pass 1 operates on the first 16 bits of serial data d[15..0] of any plane. Together inputs:

L_acc[15..0]
C_prof [15..0]

it produces 8 planes of:

L_cur[15..0]
L4_sig
L3_LH_sig
L3_HL_sig
L3_HH_sig
L2_LH_sig[3..0]
L2_HL_sig[3..0]
L2_HH_sig[3..0]

The definitions of these parameters are defined in the encoding engine.

L_pass 1 Equations

Pointers for L data pointer for L3_LH
s1_[1...0]) = 2 × (!L_acc[0] & C_prof[0]) );
pointer for L3_HL
s2_[2...0]) = s1_[1...0] × 2 × (!L_acc[1] & C_prof[7]) );
pointer for L3_HH
s3_[3...0]) = s2_[2...0] × 2 × (!L_acc[2] & C_prof[8]) );
pointer for start of L2 data
s4_[4...0]) = s3_[3...0] × 2 × (!L_acc[3] & C_prof[9]);
pointer for L2_LH[3]

| Pointers for L data |
|---|
| not required (base = 0) |
| pointer for L2__LH[2] |
| s5__[1 . . . 0] = 2 × (!L_acc[5] & L3_LH_sig_ & C_prof[10]); |
| pointer for L2__LH[1] |
| s6__[2 . . . 0]) = s5__[1 . . . 0] × 2 × (!L_acc[6] & L3_LH_sig_ & C_prof[10]); |
| pointer for L2__LH[0] |
| s7__[3 . . . 0]) = s6__[2 . . . 0] × 2 × (!L_acc[7] & L3_LH_sig_ & C_prof__[10]); |
| pointer for L2__HL[3] |
| s8__[4 . . . 0]) = s7__[4 . . . 0] × 2 × (!L_acc[8] & L3_HL_sig_ & C_prof[11]); |
| pointer for L2__HL[2] |
| s9__[5 . . . 0]) = s8__[4 . . . 0] × 2 × (!L_acc[9] & L3_HL_sig_ & C_prof[11]); |
| pointer for L2__HL[1] |
| s10__[6 . . . 0]) = s9__[5 . . . 0] × 2 × (!L_acc[10] & L3_HL_sig_ & C_prof[11]); |
| pointer for L2__HL[0] |
| s11__[7 . . . 0]) = s10__[5 . . . 0] × 2 × (!L_acc[11] & L3_HL_sig_ & C_prof[11]); |
| pointer for L2__HH[3] |
| s12__[8 . . . 0]) = s11__[7 . . . 0] × 2 × (!L_acc[12] & L3_HH_sig_ & C_prof[12]); |
| pointer for L2__HH[2] |
| s13__[9 . . . 0]) = s12__[8 . . . 0] × 2 × (!L_acc[13] & L3_HH_sig_ & C_prof[12]); |
| pointer for L2__HH[1] |
| s14__[10 . . . 0]) = s13__[9 . . . 0] × 2 × (!L_acc[14] & L3_HH_sig_ & C_prof[12]); |
| pointer for L2__HH[0] |
| s15__[11 . . . 0]) = s14__[10 . . . 0] × 2 × (!L_acc[15] & L3_HH_sig_ & C_prof[12]); |

L Data

L_Cur[3..0] for Level4 and 3

```
L_cur[0] = d[0] & (!L_acc[0] & C_prof[0]) ;
L_cur[1] = ( (d[1] & s1_[1]) #
            (d[0] & s1_[0]) ) &
            ((!L_acc[1] & C_prof[7]) & L4_sig_);
L_cur[2] = ( (d[2] & s2_[2]) #
            (d[1] & s2_[1]) #
            (d[0] & s2_[0]) ) &
            ((!L_acc[2] & C_prof[8]) & L4_sig_);
L_cur[3] = ( (d[3] & s3_[3]) #
            (d[2] & s3_[2]) #
            (d[1] & s3_[1]) #
            (d[0] & s3_[0]) ) &
            ((!L_acc[3] & C_prof[9]) & L4_sig_);
```

Locate Range of Level2 L Data[15..4]

```
L2_[4]  = s4_[4..0] & d[4..0];
L2_[5]  = s4_[4..0] & d[5..1];
L2_[6]  = s4_[4..0] & d[6..2];
L2_[7]  = s4_[4..0] & d[7..3];
L2_[8]  = s4_[4..0] & d[8..4];
L2_[9]  = s4_[4..0] & d[9..5];
L2_[10] = s4_[4..0] & d[10..6];
L2_[11] = s4_[4..0] & d[11..7];
L2_[12] = s4_[4..0] & d[12..8];
L2_[13] = s4_[4..0] & d[13..9];
L2_[14] = s4_[4..0] & d[14..10];
L2_[15] = s4_[4..0] & d[15..11];
```

L_cur[15..4] for Level2

L2_LH cur

```
L_cur[4] = L2_[4] & (!L_acc[4] & L3_LH_sig_ & C_prof[10]);
L_cur[5] = ( (L2_[5] & s5_[1]) #
            (L2_[4] & s5_[0]) ) &
            (!L_acc[5] & L3_LH_sig_ & C_prof[10]);
L_cur[6] = ( (L2_[6] & s6_[2]) #
            (L2_[5] & s6_[1]) #
            (L2_[4] & s6_[0]) ) &
            (!L_acc[6] & L3_LH_sig_ & C_prof[10]);
L_cur[7] = ( (L2_[7] & s7_[3]) #
            (L2_[6] & s7_[2]) #
            (L2_[5] & s7_[1]) #
            (L2_[4] & s7_[0]) ) &
            (!L_acc[7] & L3_LH_sig_ & C_prof[10]);
```

L2_HL cur

```
L_cur[8] = ( (L2_[8] & s8_[4]) #
            (L2_[7] & s8_[3]) #
            (L2_[6] & s8_[2]) #
            (L2_[5] & s8_[1]) #
            (L2_[4] & s8_[0]) ) &
            (!L_acc[8] & L3_HL_sig_ & C_prof[11]);
L_cur[9] = ( (L2_[9] & s9_[5]) #
            (L2_[8] & s9_[4]) #
            (L2_[7] & s9_[3]) #
            (L2_[6] & s9_[2]) #
            (L2_[5] & s9_[1]) #
            (L2_[4] & s9_[0]) ) &
            (!L_acc[9] & L3_HL_sig_ & C_prof[11]);
L_cur[10] = ((L2_[10]& s10_[6]) #
            (L2_[9] & s10_[5]) #
            (L2_[8] & s10_[4]) #
            (L2_[7] & s10_[3]) #
            (L2_[6] & s10_[2]) #
            (L2_[5] & s10_[1]) #
            (L2_[4] & s10_[0]) ) &
            (!L_acc[10] & L3_HL_sig_ & C_prof[11]);
L_cur[11] = ((L2_[11]& s11_[7]) #
            (L2_[10]& s11_[6]) #
            (L2_[9] & s11_[5]) #
            (L2_[8] & s11_[4]) #
            (L2_[7] & s11_[3]) #
            (L2_[6] & s11_[2]) #
            (L2_[5] & s11_[1]) #
            (L2_[4] & s11_[0]) ) &
            (!L_acc[11] & L3_HL_sig_ & C_prof[11]);
```

L2_HH cur

```
L_cur[12] = ((L2_[12]& s12_[8]) #
            (L2_[11]& s12_[7]) #
            (L2_[10]& s12_[6]) #
            (L2_[9] & s12_[5]) #
```

```
        (L2_[8] & s12_[4]) #
        (L2_[7] & s12_[3]) #
        (L2_[6] & s12_[2]) #
        (L2_[5] & s12_[1]) #
        (L2_[4] & s12_[0]) ) &
        (!L_acc[12] & L3_HH_sig_ & C_prof[12]);
    L_cur[13] = ((L2_[13]& s13_[9]) #
        (L2_[12]& s13_[8]) #
        (L2_[11]& s13_[7]) #
        (L2_[10]& s13_[6]) #
        (L2_[9] & s13_[5]) #
        (L2_[8] & s13_[4]) #
        (L2_[7] & s13_[3]) #
        (L2_[6] & s13_[2]) #
        (L2_[5] & s13_[1]) #
        (L2_[4] & s13_[0]) )&
        (!L_acc[13] & L3_HH_sig_ & C_prof[12]);
    L_cur[14] = ((L2_[14]& s14_[10])#
        (L2_[13]& s14_[9]) #
        (L2_[12]& s14_[8]) #
        (L2_[11]& s14_[7]) #
        (L2_[10]& s14_[6]) #
        (L2_[9] & s14_[5]) #
        (L2_[8] & s14_[4]) #
        (L2_[7] & s14_[3]) #
        (L2_[6] & s14_[2]) #
        (L2_[5] & s14_[1]) #
        (L2_[4] & s14_[0]) )&
        (!L_acc[14] & L3_HH_sig_ & C_prof[12]);
    L_cur[15] = ((L2_[15]& s15_[11])#
        (L2_[14]& s15_[10])#
        (L2_[13]& s15_[9]) #
        (L2_[12]& s15_[8]) #
        (L2_[11]& s15_[7]) #
        (L2_[10]& s15_[6]) #
        (L2_[9] & s15_[5]) #
        (L2_[8] & s15_[4]) #
        (L2_[7] & s15_[3]) #
        (L2_[6] & s15_[2]) #
        (L2_[5] & s15_[1]) #
        (L2_[4] & s15_[0]) )&
        (!L_acc[15] & L3_HH_sig_ & C_prof[12]);
```

L Significance

```
L4_sig_    = L_cur[0] # (L_acc[0] & C_prof[0]);
L3_LH_sig_ = L_cur[1] # (L_acc[1] & C_prof[7]);
L3_HL_sig_ = L_cur[2] # (L_acc[2] & C_prof[8]);
L3_HH_sig_ = L_cur[3] # (L_acc[3] & C_prof[9]);
L2_LH_sig[3..0] =(L_cur[7..4] # L_acc[7..4]) & C_prof[10]
L2_HL_sig[3..0] =(L_cur[11..8]# L_acc[11..8]) & C_prof[11]; ;
L2_HH_sig[3..0] =(L_cur[15..12]# L_acc[15..12])& C_prof[12]; ; .
```

L_Pass 2 operates on a range of data d[63..16] that has been pre-pointed to from the end of data of L_Pass 1. Together with inputs:
L_acc[63..16]
L2_LH_sig[3..0]
L2_HL_sig[3..0]
L2_HH_sig[3..0]
C_prof[15..0]
it produces 8 planes of:
L_cur[63..16]
L_acc[63..16]
L1_LH_sig[15..0]
L1_HL_sig[15..0]
L1_HH_sig[15..0]

These parameters are defined in the encoding engine

```
a[63..16] = (d[63..16] & !L_acc[63..16]) ;
L_cur[19..16] = a[19..16] & L2_LH_sig[0] & C_prof[13];
L_cur[23..20] = a[23..20] & L2_LH_sig[1] & C_prof[13];
L_cur[27..24] = a[27..24] & L2_LH_sig[2] & C_prof[13];
L_cur[31..28] = a[31..28] & L2_LH_sig[3] & C_prof[13];
L_cur[35..32] = a[35..32] & L2_HL_sig[0] & C_prof[14];
L_cur[39..36] = a[39..36] & L2_HL_sig[1] & C_prof[14];
L_cur[43..40] = a[43..40] & L2_HL_sig[2] & C_prof[14];
L_cur[47..44] = a[47..44] & L2_HL_sig[3] & C_prof[14];
L_cur[51..48] = a[51..48] & L2_HH_sig[0] & C_prof[15];
L_cur[55..52] = a[55..52] & L2_HH_sig[1] & C_prof[15];
L_cur[59..56] = a[59..56] & L2_HH_sig[2] & C_prof[15];
L_cur[63..60] = a[63..60] & L2_HH_sig[3] & C_prof[15];
b[63..16] = (d[63..16] & !L_acc[63..16]) # L_acc[63..16];
L1_LH_sig[3..0] = b[19..16] & L2_LH_sig[0] & C_prof[13];
L1_LH_sig[7..4] = b[23..20] & L2_LH_sig[1] & C_prof[13];
L1_LH_sig[11..8] = b[27..24] & L2_LH_sig[2] & C_prof[13];
L1_LH_sig[15..12] = b[31..28] & L2_LH_sig[3] & C_prof[13];
L1_HL_sig[3..0] = b[35..32] & L2_HL_sig[0] & C_prof[14];
L1_HL_sig[7..4] = b[39..36] & L2_HL_sig[1] & C_prof[14];
L1_HL_sig[11..8] = b[43..40] & L2_HL_sig[2] & C_prof[14];
L1_HL_sig[15..12] = b[47..44] & L2_HL_sig[3] & C_prof[14];
L1_HH_sig[3..0] = b[51..48] & L2_HH_sig[0] & C_prof[15];
L1_HH_sig[7..4] = b[55..52] & L2_HH_sig[1] & C_prof[15];
L1_HH_sig[11..8] = b[59..56] & L2_HH_sig[2] & C_prof[15];
L1_HH_sig[15..12] = b[63..60] & L2_HH_sig[3] & C_prof[15].
```

The K Decoder

K_Pass operates on a range of data that has been pre-pointed to from the end of data of L_Pass 2. Together with inputs:

16×d[15..0]

16×C_acc[63..0]

16×L_sig[3..0] Note that L_sig[3..0] is a sequential quad mapping of:

L4_sig,L3_LH_sig. L3_HL_sig, L3_HH_sig to

L1_HH_sig[15..12]

it produces:

16×K_cur[15..0] per plane

16×K_msk[15..0] per plane

K Accumulate from C Accumulate

```
K_acc[0] = C_acc[0] # C_acc[1] # C_acc[2] # C_acc[3];
K_acc[1] = C_acc[4] # C_acc[5] # C_acc[6] # C_acc[7];
K_acc[2] = C_acc[8] # C_acc[9] # C_acc[10] # C_acc[11];
K_acc[3] = C_acc[12] # C_acc[13] # C_acc[14] # C_acc[15];
K_acc[4] = C_acc[16] # C_acc[17] # C_acc[18] # C_acc[19];
K_acc[5] = C_acc[20] # C_acc[21] # C_acc[22] # C_acc[23];
K_acc[6] = C_acc[24] # C_acc[25] # C_acc[26] # C_acc[27];
K_acc[7] = C_acc[28] # C_acc[29] # C_acc[30] # C_acc[31];
K_acc[8] = C_acc[32] # C_acc[33] # C_acc[34] # C_acc[35];
K_acc[9] = C_acc[36] # C_acc[37] # C_acc[38] # C_acc[39];
K_acc[10]= C_acc[40] # C_acc[41] # C_acc[42] # C_acc[43];
K_acc[11]= C_acc[44] # C_acc[45] # C_acc[46] # C_acc[47];
K_acc[12] = C_acc[48] # C_acc[49] # C_acc[50] # C_acc[51];
K_acc[13] = C_acc[52] # C_acc[53] # C_acc[54] # C_acc[55];
K_acc[14] = C_acc[56] # C_acc[57] # C_acc[58] # C_acc[59];
K_acc[15] = C_acc[60] # C_acc[61] # C_acc[62] # C_acc[63];
K_cur[15..0] =      d[15..0] & (!K_acc[15..12] & L_sig[3],
                    !K_acc[11..8] & L_sig[2],
                    !K_acc[7..4]  & L_sig[1],
                    !K_acc[3..0]  & L_sig[0]) & K_pass_en;
K_msk[15..0] =      ( K_cur[15..0] # (K_acc[15..12] & L_sig[3],
                    K_acc[11..8] & L_sig[2],
                    K_acc[7..4]  & L_sig[1],
                    K_acc[3..0]  & L_sig[0]) ) & K_pass_en;
```

The C Decoder

C_Pass operates on a range of data that has been pre-pointed to from the end of data of K_Pass. Together with inputs:

16×d[63..0]
16×C_acc[63..0]
16×K_msk[15..0]
16×L_sig[3..0]
it produces:
16×C_cur[63..0] per plane
16×S_msk[63..0] per plane

---

C_cur[63..0] =      d[63..0] &
                 (K_msk[15], K_msk[15], K_msk[15], K_msk[15],
                 K_msk[14], K_msk[14], K_msk[14], K_msk[14],
                 K_msk[13], K_msk[13], K_msk[13], K_msk[13],
                 K_msk[12], K_msk[12], K_msk[12], K_msk[12],
                 K_msk[11], K_msk[11], K_msk[11], K_msk[11],
                 K_msk[10], K_msk[10], K_msk[10], K_msk[10],
                 K_msk[9], K_msk[9], K_msk[9], K_msk[9],
                 K_msk[8], K_msk[8], K_msk[8], K_msk[8],
                 K_msk[7], K_msk[7], K_msk[7], K_msk[7],
                 K_msk[6], K_msk[6], K_msk[6], K_msk[6],
                 K_msk[5], K_msk[5], K_msk[5], K_msk[5],
                 K_msk[4], K_msk[4], K_msk[4], K_msk[4],
                 K_msk[3], K_msk[3], K_msk[3], K_msk[3],
                 K_msk[2], K_msk[2], K_msk[2], K_msk[2],
                 K_msk[1], K_msk[1], K_msk[1], K_msk[1],
                 K_msk[0], K_msk[0], K_msk[0], K_msk[0])&
                 C_pass_en;
S_msk[63..0] =    C_cur_[63..0] & (!C_acc[63..48] & L_sig[3],
                 !C_acc[47..32] & L_sig[2],
                 !C_acc[31..16] & L_sig[1],
                 !C_acc[15..0] & L_sig[0]) & C_pass_en;

---

The S decoder

S_Pass operates on a range of data that has been pre-pointed to from the end of data of C_Pass. Together with inputs:
16×d[63..0]
16×S_msk[63..0]
it produces:
16×S_cur[63..0] per pass_en
S_cur[63..0]=(d[63..0] & S_msk[63..0]) & S_pass_en;

Encoding for Temporal Compression

Temporal compression is the key to achieving high compression ratios. However some methods are computationally intensive, with the processing time being highly dependent on the image content. In the preferred scheme two priorities are addressed:

(a) Whatever method is used must retain the determinism of the transform and coding engines. In this way the overall process is simplified, and the time taken to encode content is precisely defined.

(b) The data to be streamed must be "absolute"; that is to say that the images can be reconstructed using only the data received, and there is no dependency on image history or forward prediction. The concept of absolute data provides high immunity to network errors, and, in particular, does not extend image latency. (Extended image latency, i.e. a multiple frame delay between encoding and decoding, is inevitable with any system that requires complex computation over a group of images.)

The basis of the preferred temporal compression scheme is to code only the picture information that has changed. The scheme exploits the fact that areas of picture content can remain static over several frames, which it detects and does not code. In this way large coding gains are achieved. For this scheme to be viable, accurate and secure detection of changes is of paramount importance, since any false detections of change will produce obvious errors—manifested in "frozen" areas of the decoded image.

The secure detection of motion is at the heart of the scheme. However it is much more difficult to devise a scheme based on the sending of absolute data than it is to use a scheme relying on only sending the differences between changes (as is done with, for example, MPEG). The difficulty arises because of the presence of noise in the images, and the consequent problem of discriminating between true picture content and the noise. The noise arises for two principal reasons; camera sensor noise (particularly in scenes with low lighting levels) and quantization noise arising from analog to digital signal conversion.

The basis of the preferred method of discriminating between noise and image content is to process the motion detection in the wavelet domain—i.e. at the transform output, prior to coding. "De-noising" in the wavelet domain is based on an idea first proposed by Donoho who noticed that the wavelet transform maps noise in the signal domain to noise in the transform.

For any given image, signal energy becomes concentrated into fewer coefficients in the transform domain—but noise energy does not. It is this important principle that enables the separation of signal from noise, achieved by "thresholding" the wavelet coefficients. Since noise is at a much lower level than the significant coefficients, intelligent low level thresholding can be applied to remove only the low level coefficients deemed to be noise. The thresholding is dynamic across the transform levels in order to achieve optimum noise suppression. The preferred scheme is novel because the signal is separated from the noise by non-linear means—in some ways the process is akin to the method used to apply the compression profile described above.

In the preferred temporal compression scheme only a sparse set of the most significant coefficients is used as the basis for noise removal. This aggressive approach is designed to obtain a super-clean "wavelet signature" for motion detection. This "signature" is not required to resemble a recognizable picture, but only to be the means of valid change detection.

Definition of Temporal Compression

The aim of the temporal compression algorithm is to minimize the computation needed. In the preferred system advantage is taken of the nature of the initial color space transform.

The boundary for defining motion is the YUV transformed block of 32×32 coefficients. Each block is numbered in a way that defines its position within an image frame. Corresponding blocks between frames are compared, and only if they are different are coded and transmitted. Since Y itself can be considered as being derived from U and V, it is sufficient to use only the Y coefficients for assessing motion. This has the effect of reducing the requirement for motion computation and frame storage to only one third of what it would be if the computation was done for the full YUV (or RGB) image.

The process of temporal encoding is shown diagrammatically in FIG. 19, which indicates the following steps in the process:

1. Extract the Y transform information in 32×32 blocks; assign position information for each block.
2. Apply a noise threshold to the data. This eliminates all coefficients below a programmed value. This "threshold" is very low and is only intended to eliminate insignificant coefficients that are at noise level.
3. Detect the magnitude and position of the most significant coefficients. In this process the 16 sub-bands that form the five-level transform are each filtered to select the most significant coefficient and its associated position.
4. From the 16 resulting coefficients select the most significant. The number selected is programmable, and in practice a maximum of eight is found to be sufficient. The idea behind the scheme is to get sufficient information to ensure reliable motion detection, but at the same time achieve maximum noise immunity by capping the size of the group of most significant coefficients. This information summarizing the significant coefficient and corresponding positional data is referred to as a "wavelet signature".

5. Compare the resulting "signature" with that of the corresponding block in the previous image frame. At this stage another programmable threshold is applied. This "difference threshold" may allow certain comparisons that are not exact to be still considered true—it allows for small peak modulation differences between coefficients, and is applied only to magnitude, and not position, information.

6. As a result of the comparison, there is no transmission if signatures are the same; there is transmission of data for coding if the signatures are different. Note that the data that goes forward for coding is the original YUV transform data. This is an important principle since it ensures that (within the constraints of the compression profile) the highest possible image quality is maintained, and that the code/decode processes do not have to distinguish between still and moving image data.

Reference Frame Data

The temporal compression scheme is also organized to output reference frame data for synchronizing the decoder(s) to the current status of the encoder. The process can be considered as providing a "background" image refresh facility.

The facility ensures that, regardless of the decision taken at Step 6 (see above), the full YUV transform data of a block is sent at intervals. The interval is programmable, in order to ensure that sending of reference frame data has a minimum impact on data flow in the output network. The parameter is defined by "one reference block sent for every x normal blocks" with x typically 100 or more.

This refresh mechanism is independent of image resolution and asynchronous to temporal changes in the image, and is, therefore, image content independent: it merely sends the latest update for a block, governed by the index of the block within the current frame. It can be seen that to refresh an entire high resolution image this way could take some seconds; but such a system deals effectively with errors (e.g. arising from network problems) affecting still images, and supports multiple users where, for example, a new user logs on and otherwise would not receive still image data until the original image was changed.

The Network Connection

The task here is to convert the compressed image data to a form that can be passed over an Ethernet network. The image data is in the form of coded "image blocks" each of which describes a 32×32 array of pixels. Such a block does not necessarily match the payload specification of Ethernet. In addition there must be provision for multiplexing digital audio data into the final data stream.

Each YUV block is encoded on the basis of leading most significant data to trailing least significant data. The block format is shown in Table 4.

TABLE 4

The image block format.

| Field | Size (in bits) | Description |
| --- | --- | --- |
| ID | 32 | SYNC word - 16 bits<br>Index Number - 11 bits (defines position of block in the frame)<br>Spare - 5 bits |
| Block data | variable | YUV compressed data in order:<br>Y bit plane 7 L-types<br>Y bit plane 7 K-types<br>Y bit plane 7 C-types<br>Y bit plane 7 S-types<br>Y bit plane 6 L-types<br>And so on through . . .<br>Y bit plane 0 S-types<br>Then repeat for U and V |

Choice of User Datagram Protocol (UDP)

Early in the development program behind the present invention many different methods of multiplexing and transmitting image data over a digital link were considered; but then the decision was taken to ride on the back of the universally accepted Ethernet network using Internetwork Protocol. It was then important to ensure the system would work on "real world" networks and that it did not introduce any practical difficulties.

As a result, the guiding principles in defining how the data is transmitted across a network are as follows:

(a) The aim is reliable and efficient transport of real time images; notwithstanding the fact that networks are asynchronous in nature—conflicting with the requirement of synchronous image delivery.

(b) The system must be based on existing network transport standards and protocols.

(c) There must be low system complexity across the network.

(d) The system must work as a multi-node system (i.e. typically one image source being distributed to multiple "users" or "viewers").

(e) As a corollary, there must be no need for the capture node(s) to manage the display node(s) in any way. This minimizes the computational complexity of nodes, and (in this execution) provides scalability.

The technical requirement is to get the data into a format that matches the IEEE 802.3 Media Access Control (MAC) frame as shown in FIG. 24. The last requirement above indicates a "multicast" approach, and the accepted method of achieving this is that the MAC "payload" follows Internetwork Protocol (IP) in the form of "datagrams" following the User Datagram Protocol (UDP). Multicast messages have a special Multicast "Destination Address". Note that the maximum data packet size is 1500 bytes, which must include any protocol overhead. Larger packets are permitted on Gigabit Ethernet.

UDP has the great merits of simplicity and minimum data overhead. But like IP it is a connectionless protocol that does not itself provide any guarantee of reliable communication; nor does it provide any form of error correction or recovery, or any kind of message flow control. Communication is "best effort", and any means of overcoming deficiencies must reside in the application.

In order to eliminate the need for any bidirectional communication (as is used in the connection oriented protocol Transport Control Protocol (TCP) and which provides reliable point-to-point communication) the preferred system is designed to be robust against packet loss. Table 4 shows that each data block is separated by a uniquely coded sync word. In the event that data from a block or series of blocks is damaged, the sync word is designed to arrest propagation of the error. The sync word is used to "bracket" errors, thus preventing the decoded bit stream displaying garbage. In the case of error(s) the last intact block or blocks continue to be displayed.

Translation to IP packets

The matching of the image data to IP/UDP is a two stage process. The first stage is to convert the original coded YUV block data into a series of standardized data packets. It is at this point that any accompanying audio is multiplexed with the image data. Audio is carried as uncompressed digital audio according to AES/SPDIF standards (Dolby AC3 can also be carried). Table 5 shows the packet format.

TABLE 5

The packet format for the multiplexed audio/video stream.
Byte order is "Little endian" (Intel) format.

| Field | Size (in bits) | Description |
|---|---|---|
| ID | 32 | "VID0" - 0x56494430 "AUD0" - 0x41554430 |
| Data Start | 1 | The first packet in a set of data |
| Haar | 1 | Transform, Haar/2-10 |
| Profile Y | 4 | Compression Profile |
| Profile U | 4 | |
| Profile V | 4 | |
| Reserved | 2 | |
| Packet Size | 16 | The size of the data packet in bytes |
| PTS | 32 | The time stamp of the data packet in 10 μs units |
| Data | {packet size} * 8 | The raw data. |

The resulting bit stream is placed in a buffer memory, and then converted to Ethernet payload with the addition of the necessary headers. The whole process is illustrated in FIG. 25.

An item not clearly shown in FIG. 25 is an additional Real Time Protocol (RTP) header that is carried between the Transport Layer Header and the Transport Layer Payload.

The "Data start for video" marks a frame start, marking the first packet in a variable number of packets required for a frame. (The number of packets needed for a frame varies according to the nature of the image, the compression profile and the influence of temporal compression.) Because there is no alignment between the original image blocks and the packet boundaries, the last packet may only be partially filled. In this case the packet is packed with zeroes to make up the packet size.

Network Loading

It is clear from the above that the "loading" presented to a network carrying the compressed images is variable according to the nature of the image. In practice it is found that for any given image resolution and compression profile the average bit rate remains fairly constant. This means that in any real application it is easy to ensure that there is sufficient network capacity for the images, and this is especially the case where multiple images are being carried, since statistically the overall bit rate will remain constant within quite narrow limits.

It should be noted that the "programmable" aspects of the overall system can be applied on an individual frame basis. This means that it is possible to change compression performance, and hence average bit rate, "on the fly". Thus while the system does not offer a constant bit rate, it does offer predictable performance and the ability to change the bit rate rapidly should this be necessary.

Decoding Options

The intended principle of the preferred system is that the encode and decode processes are symmetrical. Thus the normal execution of the decode process will be the inverse of that shown in FIG. 12, and can be based on a similar hardware configuration. In summary:

(a) The incoming data stream is "depacketized", i.e. all overhead data related to the UDP format and to error correction is removed, and the coded YUV block data is recovered.

(b) By receiving the compression profile information first, it is then possible to apply this information to the compressed block data, and thereby to recover the complete LKCS information. Note that in many cases a complete "tree" may be represented by only a single bit in the coded state, but on decoding all the "hidden" values are restored.

(c) The LKCS information is used to create the complete set of wavelet coefficients.

(d) This data undergoes the reverse transform to recover the L and H values using Equations 13 and 15. As with the encode process, this requires multiple passes through the reverse transform engine, until Level 1 "vertical" is reached. As in the encode process, "row and column" control is used to allow the simple one dimension reverse transform engine to be used.

(e) The recovered data is then put through a second reverse transform engine, operating only in the horizontal Level 1 dimension, to recover the individual pixel data.

(f) The pixel data (now back at 16 bit for two pixels) is transformed from YUV back to 8 bit RGB.

Dealing with Packet Loss

In a real world network there is a significant chance of data packets being lost. For example ITU Recommendation Y.1541 (Network performance objectives for IP-based services) envisages an IPLR (IP packet loss ratio) of $1 \times 10^{-3}$ on an IP network. Clearly this could have a catastrophic effect on the received image. However, in order to avoid the additional overhead that would arise from the use of complex forward error correction (which would increase both bandwidth and latency) the preferred system uses its own image block format (Table 4) to provide a method of discarding corrupted data resulting from packet loss.

The data stream is continuous, but the sync words are easily distinguished as a series of 16 bits value 1. FIG. 26 shows two consecutive blocks of YUV data, and it can be seen that, if all is well, each block has its own sync word, but at the end of the block there is the sync word of the next block.

In an IP network each IP packet is validated using a CRC checksum. If the IP packet is invalid, it is discarded. The effect on the image bit stream shown in the figure is that a section is chopped out and, typically, two lots of unrelated block data could get joined together.

While the length of the block is variable, the "tree" nature of the image data is such that the decoder "knows" when it has received enough data to complete the image reconstruction, and, therefore, when it should expect to see the next sync word. This feature is exploited to validate block data before it is sent on to the display memory.

The mechanism is that block data of the form YUV $BLOCK_m$ is validated by its own SYNC $WORD_m$, and its immediate neighbor's SYNC $WORD_n$. A "YUV Block Send Module" in the decoder stores the decoded YUV block, and if a trailing SYNC word is present at the end of a decoded YUV block, the module passes the YUV block on to the display memory. If it is not present, the decoded YUV block is discarded.

The special case of the last block in an image frame, which would not normally see a following sync word, is dealt with by the insertion of an additional sync word at end of frame.

This ensures that only valid YUV blocks are passed on to the display. The method works because the YUV blocks contain absolute image data, and do not depend on either historical or forward data. In the event that a block is discarded, the display system continues to show the previous "good" YUV image block. In systems operating at typical display frame rates (24-60 Hz) the random errors arising from lost packets are, in practice, not noticeable.

Software Decode

The intended applications of the preferred system are such that, in most cases, hardware decoding will be used to ensure deterministic performance. However, it is clear from the description given so far that the "output" of the encode process is a bit stream that describes an image or set of images. Therefore in theory anyone with knowledge of the bit stream syntax could devise a means of decoding it using software methods only.

It is envisaged that a "software decode" product might be developed to meet particular market needs: these would likely be where a lower level of performance was acceptable (for example for reviewing images at low resolution or examining partial images).

Advantages of the Compressed Image Format

The description so far has covered the concept of a codec (coder-decoder) that displays symmetry in the encoding and decoding processes, that is deterministic (with the exception of bit rate in the temporal compression process) and that introduces minimum latency. Clearly there is the possibility of introducing additional image processing features, particularly at the decode stage. The coded data represents a highly economical "shorthand" description of the underlying images—and this means that operations that would be computationally intensive in the pixel domain can be carried out with minimum resources in the coded block domain. This is especially the case when a single codec unit is used to simultaneously process multiple images (for example a codec realized using an industry standard FPGA can process eight standard video images simultaneously).

Some of the possibilities are:
(a) Compositing multiple image displays by selecting only the required blocks from different image streams, and re-ordering to produce the required display format.
(b) Selecting different image fidelities (by electing not to decode all levels of the transform).
(c) Selecting image blocks to match the capabilities of the display node. (For example the image stream may be carrying the equivalent of 1600×1200, but the display is only able to show 800×600). N.B This does not imply re-sizing, which is a separate subject.

An important theoretical point is that any processing or reordering done at the coded block level can be thought of as being done in faster than real time. For example, if an image has been compressed 20:1, any processing will take place in one twentieth of the time that the corresponding processing would take at the pixel level.

SUMMARY

A summary of some of the advantageous features of the preferred implementation of image compression based on wavelet transforms is as follows:
(a) Use of the Property of Precision Preservation in the combined result of the RGB to YUV transform and wavelet transform to provide an overall reversible lossless transform without bit growth.
(b) High speed scalable transform engine based on parallel pipeline architecture. Programmable choice of transform to optimize results for either graphics or moving image applications. Transform processing deterministic—i.e. carried out in precise cycle time and quite independent of image content. Minimum practicable latency.
(c) Method of achieving the results of a full frame transform for moving images while actually carrying out all processing in the block domain (use of "out of block" transform data).
(d) Novel "LKCS" coding arrangement designed to exploit the characteristics of the wavelet transform that can lead to efficient compression.
(e) Programmable Compression Profile, able to provide lossless, visually lossless and high compression ratios at high spatial compression efficiency, for example, a ratio of highest to lowest bit stream rate of 1000:1.
(f) Novel programmable temporal compression scheme based on the application of wavelet signatures. Absolute coding, not requiring image history or forward prediction; no extension of image latency. Use of reference frames to eliminate effects of transmission errors.
(g) Self-describing bit stream to carry the coded image block data.
(h) The system output is configured for connectionless network operation, providing for the configuration of a scalable multiple image network. High immunity to network transmission errors.
(i) Novel method of detecting IP packet loss, taking advantage of the nature of the encoded bit stream.

The invention claimed is:

1. A method of transforming a video stream comprising a sequence of images, each image comprising pixels arranged in a first two-dimensional array, said first two-dimensional array comprising a first dimension and a second dimension, said method transforming said sequence of images into a corresponding sequence of sets of multi-level transformed wavelet coefficients, each of said sets of multi-level transformed wavelet coefficients arranged in a second two-dimensional array comprising said first and second dimensions, said transforming performed using asymmetric parallel processing implemented by an encoding system comprising first and second transform engines, a shared memory, and a controller, each of said transform engines configured to receive pairs of input data values and transform each of said pairs of input data values into a pair of output data values, each of said pair of output data values comprising a smooth output data value obtained by applying a first filter to said pair of input data values and a detail output data value obtained by applying a second filter to said pair of input data values, said method comprising the steps of:

said first transform engine receiving as first pairs of input data values pairs of pixel values from a first image from said video stream each of said first pairs of input data values comprising a first pixel value of a first pixel and a second pixel value of a second pixel immediately adjacent to said first pixel along said first dimension of said first two-dimensional array;

said first transform engine applying said first and second filters to said first pairs of input data values, thereby transforming said first pairs of input data values into first pairs of output data values, said first pairs of output data values comprising first level one once transformed wavelet coefficients;

said controller storing said first level one once transformed wavelet coefficients as a third two-dimensional array comprising said first and second dimensions in a first memory storage area of said shared memory;

said controller providing said first level one once transformed wavelet coefficients from said first memory storage area to said second transform engine as second pairs of input data values, each of said second pairs of input data values comprising a first first level one once transformed wavelet coefficient from said third two-dimensional array and a second first level one once transformed wavelet coefficient immediately adjacent to said first first level one once transformed wavelet coefficient along said second dimension of said third two-dimensional array;

said second transform engine applying said first and second filters to said second pairs of input data values, thereby transforming said second pairs of input data values into second pairs of output data values, said second pairs of output data values comprising first level one twice transformed wavelet coefficients;

said controller storing said first level one twice transformed wavelet coefficients in said third two-dimensional array by overwriting said first level one once transformed wavelet coefficients;

said controller providing a first portion of said first level one twice transformed wavelet coefficients from said third two-dimensional array to said second transform engine as third pairs of input data values, each of said third pairs of input data values comprising a first first level one twice transformed wavelet coefficient from said third two-dimensional array and a second first level one twice transformed wavelet coefficient immediately adjacent to said first first level one twice transformed wavelet coefficient along said first dimension of said third two-dimensional array;

said second transform engine applying said first and second filters to said third pairs of input data values, thereby transforming said third pairs of input data values into third pairs of output data values, said third pairs of output data values comprising first level one three-times transformed wavelet coefficients;

said controller storing said first level one three-times transformed wavelet coefficients in said third two-dimensional array by overwriting said first portion of said first level one twice transformed wavelet coefficients;

said first transform engine receiving as fourth pairs of input data values pairs of pixel values from a second image from said video stream, each of said fourth pairs of input values comprising a third pixel value of a third pixel and a fourth pixel value of a fourth pixel immediately adjacent to said third pixel along said first dimension of said first two-dimensional array;

said first transform engine applying said first and second filters to said fourth pairs of input data values, thereby transforming said fourth pairs of input data values into fourth pairs of output data values, said fourth pairs of output data values comprising second level one once transformed wavelet coefficients;

said controller providing first additional pairs of input data values to said second transform engine, said first additional pairs of input data values comprising pairs of immediately adjacent wavelet coefficients from portions of said third two dimensional array;

said second transform engine performing a plurality of higher level transformations on said first additional pairs of input data values by applying said first and second filters to said first additional pairs of input data values to generate a first of sets of multi-level transformed wavelet coefficients stored in said first memory storage area;

said controller storing said second level one once transformed wavelet coefficients as a fourth two-dimensional array comprising said first and second dimensions in a second memory storage area of said shared memory.

2. A method as claimed in claim 1, wherein said first dimension is a horizontal dimension.

3. A method as claimed in claim 1, further comprising the steps of:

said controller providing said second level one once transformed wavelet coefficients from said second memory storage area to said second transform engine as fifth pairs of input data values, each of said fifth pairs of input data values comprising a first second level one once transformed wavelet coefficient from said fourth two-dimensional array and a second second level one once transformed wavelet coefficient immediately adjacent to said first second level one once transformed wavelet coefficient along said second dimension of said fourth two-dimensional array;

said second transform engine applying said first and second filters to said fifth pairs of input data values, thereby transforming said fifth pairs of input data values into fifth pairs of output data values, said fifth pairs of output data values comprising second level one twice transformed wavelet coefficients;

said controller storing said second level one twice transformed wavelet coefficients in said fourth two-dimensional array by overwriting said second level one once transformed wavelet coefficients;

said controller providing second additional pairs of input data values to said second transform engine, said second additional pairs of input data values comprising pairs of immediately adjacent wavelet coefficients from portions of said fourth two dimensional array;

said second transform engine performing a plurality of higher level transformations on said second additional pairs of input data values by applying said first and second filters to said second additional pairs of input data values to generate a second of said sets of multi-level transformed wavelet coefficients stored in said second memory storage area.

4. A method as claimed in claim 3, applied to a plurality of further images from said video stream, comprising said controller storing each set of multi-level transformed wavelet coefficients resulting from transforming each further odd-numbered image in said first memory storage area, and said controller storing each set of multi-level transformed wavelet coefficients resulting from transforming each further even-numbered image in said second memory storage area.

5. A method as claimed in claim 4, wherein said sets of multi-level transformed wavelet coefficients are stored by said controller in their respective memory storage area so as to overwrite at least some portion of the wavelet coefficients already stored therein.

6. A method as claimed in claim 1, wherein said step of said first transform engine applying said first and second filters to said fourth pairs of input data values commences before the completion of said step of said controller providing said first level one once-transformed wavelet coefficients from said first memory storage area to said second transform engine.

7. A method as claimed in claim 3, wherein said steps performed on said first and second images are performed on a plurality of subsequent images from said video stream, wherein said steps performed on said first image are applied to odd-numbered images and said steps performed on said second image are applied to even-numbered images.

8. A method as claimed in claim 1 wherein said first filter implements the function:

$$s(n)=\lfloor(x(2n)+x(2n+1))/2\rfloor$$

wherein x(2n) and x(2n+1) comprise said input data values and s(n) comprises said smooth output data value.

9. A method as claimed in claim 8 wherein said second filter implements the function:

$$d(i)=x(2n)-x(2n+1)+p(n)$$

wherein x(2n) and x(2n+1) comprise said input data values, p(n) comprises a predictor data value, and d(n) comprises said detail output data value.

10. A method as claimed in claim 9 wherein said predictor data value is zero.

* * * * *